(12) United States Patent
Merlin et al.

(10) Patent No.: US 10,194,427 B2
(45) Date of Patent: Jan. 29, 2019

(54) METHODS AND APPARATUS FOR MULTIPLE USER UPLINK

(71) Applicant: QUALCOMM Incorporated, San Diego, CA (US)

(72) Inventors: Simone Merlin, San Diego, CA (US); Alfred Asterjadhi, San Diego, CA (US); George Cherian, San Diego, CA (US); Bin Tian, San Diego, CA (US); Arjun Bharadwaj, Poway, CA (US); Gwendolyn Denise Barriac, Encinitas, CA (US); Yan Zhou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 73 days.

(21) Appl. No.: 15/298,093

(22) Filed: Oct. 19, 2016

(65) Prior Publication Data
US 2017/0127404 A1    May 4, 2017

Related U.S. Application Data

(60) Provisional application No. 62/249,893, filed on Nov. 2, 2015.

(51) Int. Cl.
| H04W 4/00 | (2018.01) |
| H04W 72/04 | (2009.01) |
| H04B 7/0413 | (2017.01) |
| H04L 27/26 | (2006.01) |
| H04W 72/12 | (2009.01) |
| H04W 84/12 | (2009.01) |

(52) U.S. Cl.
CPC ...... *H04W 72/0413* (2013.01); *H04B 7/0413* (2013.01); *H04L 27/26* (2013.01); *H04W 72/1289* (2013.01); *H04W 72/121* (2013.01); *H04W 84/12* (2013.01)

(58) Field of Classification Search
CPC combination set(s) only.
See application file for complete search history.

(56) References Cited

U.S. PATENT DOCUMENTS

| 9,232,502 | B2 * | 1/2016 | Zhu | H04W 74/0816 |
| 9,641,234 | B2 * | 5/2017 | Moon | H04B 7/0621 |
| 9,800,501 | B2 * | 10/2017 | Merlin | H04L 47/12 |
| 9,894,641 | B2 * | 2/2018 | Ding | H04W 72/0413 |

(Continued)

OTHER PUBLICATIONS

Marvell (HE PHY Padding and packet Extension, IEEE 802.11-15/0810, Sep. 2015) (Year: 2015).*

(Continued)

*Primary Examiner* — Maharishi V Khirodhar
(74) *Attorney, Agent, or Firm* — Knobbe, Martens, Olson & Bear, LLP

(57) ABSTRACT

Methods and apparatus for multiple user uplink are provided. In one aspect, a method for wireless communication is provided. The method includes transmitting a clear to transmit (CTX) message to two or more stations, the CTX indicating an uplink transmission opportunity, the CTX message further comprising a request that the two or more stations concurrently transmit uplink data at a specific time. The method further includes receiving a plurality of uplink data from at least two stations at the specific time.

28 Claims, 13 Drawing Sheets

(56) References Cited

U.S. PATENT DOCUMENTS

| | | | | |
|---|---|---|---|---|
| 2011/0268054 | A1* | 11/2011 | Abraham | H04W 74/06 370/329 |
| 2012/0060075 | A1* | 3/2012 | Gong | H04L 1/0025 714/776 |
| 2012/0327915 | A1* | 12/2012 | Kang | H04L 5/0007 370/336 |
| 2015/0063111 | A1 | 3/2015 | Merlin et al. | |
| 2015/0382342 | A1* | 12/2015 | Seok | H04W 74/0816 370/336 |
| 2016/0105304 | A1* | 4/2016 | Kwon | H04L 27/2665 370/338 |
| 2016/0127233 | A1* | 5/2016 | Wentink | H04W 72/1289 370/392 |
| 2016/0366701 | A1* | 12/2016 | Chu | H04W 74/0816 |
| 2016/0373559 | A1* | 12/2016 | Nabetani | H04L 1/16 |
| 2018/0048574 | A1* | 2/2018 | Merlin | H04L 47/12 |

OTHER PUBLICATIONS

DSP Group (Dynamic Sensitivity Control for Hew SG, IEEE 802.11-13/1290r1, Nov. 2013) (Year: 2013).*

Intel (Random Access with trigger Frames using OFDM,IEEE 802.11-15/0604r0, May 2015) (Year: 2015).*

Marvell (HE PHY Padding and Packet extension, IEEE 802.11-15/0810, Sep. 12, 2015. (Year: 2015).*

Intel (Random Access with Trigger Frames using OFDM, May 2015, IEEE 802.11-15/0604r0). (Year: 2015).*

Ghosh C., et al. "Random Access with Trigger Frames using OFDMA; 11-15-0604-00-00ax-random-access-with-trig ger-frames-using-ofdma," IEEE Draft;11-15-0604-00-00AX-Random-Access-With-Trig Ger-Frames-Using-OFDMA, IEEE-SA Mentor, Piscataway, NJ USA, vol. 802.11ax, May 11, 2015 (May 11, 2015), pp. 1-16, XP068094472. [retrieved on May 11, 2015].

International Search Report and Written Opinion—PCT/US2016/057936—ISA/EPO—dated Feb. 1, 2017.

Orfanos G., et al., : "Efficient Power Control for MC-CDMA based WLANs", Proceedings European Wireless 2005, Apr. 13, 2005 (Apr. 13, 2005), pp. 1-7,Nicosia, Cyprus; ISBN: 978-3-8007-2886-2.; XP002720943; Retrieved from the Internet:URL:http://ieeexplore.ieee.org/xpls/abs_all.jsp?arnumber=5755314&tag= 1 [retrieved on Feb. 26, 2014].

Smith G (DSP Group): "Dynamic Sensitivity Control for HEW; 11-13-1290-01-0hew-dynamic-sensitivity-contro1-for-hew," IEEE Draft; 11-13-1290-01-0HEW-Dynamic-Sensitivity-Control-For-HEW, IEEE-SA Mentor, Piscataway, NJ USA, vol . 802.11 HEW, No. 1, Apr. 2, 2014 (Apr. 2, 2014), pp. 1-26, XP068068809.

Zhang H. et al., "HE PHY Padding and Packet Extension; 11-15-0810-01-00ax-he-phy-padding-and-packet-extension," IEEE Draft; 11-15-0810-01-00AX-HE-PHY-Padding-And-Packet-Extension, IEEE-SA Mentor, Piscataway, NJ USA, vol. 802.11ax, No. 1, Sep. 14, 2015 (Sep. 14, 2015), pp. 1-46, XP068098035.

* cited by examiner

METHODS AND APPARATUS FOR MULTIPLE USER UPLINK

CROSS REFERENCE TO RELATED APPLICATIONS

This application claims priority to U.S. provisional application No. 62/249,893, filed Nov. 2, 2015 and entitled "METHODS AND APPARATUS FOR MULTIPLE USER UPLINK." The content of this prior application is considered part of this application, and is hereby incorporated by reference in its entirety.

BACKGROUND

Field

Certain aspects of the present disclosure generally relate to wireless communications, and more particularly, to methods and apparatus for multiple user uplink communication in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple wireless stations to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect disclosed is an apparatus for wireless communication. The apparatus includes an electronic hardware processor configured to generate a clear to transmit message comprising a first indication of an uplink transmission opportunity, the clear to transmit message further comprising a request for two or more stations to concurrently transmit uplink data at a specific time, a transmitter configured to transmit the clear to transmit message to the two or more stations; and a receiver configured to receive a plurality of uplink data transmissions at the specific time from at least two stations of the two or more stations.

In some aspects of the apparatus, the electronic hardware processor is further configured to generate the clear to transmit message to comprise a common information field including information common to all of the two or more stations and two or more individual information fields corresponding to each of the two or more stations respectively. In some aspects of the apparatus, the electronic hardware processor is further configured to generate the clear to transmit message to comprise a duration field of nine bits indicating a number of OFDM symbols to be used for the plurality of uplink data transmissions.

In some aspects of the apparatus, the electronic hardware processor is further configured to generate the clear to transmit message to comprise an indication of whether the two or more stations are to include packet extension symbols at an end of the plurality of uplink data transmissions. In some aspects of the apparatus, the electronic hardware processor is further configured to generate the clear to transmit message to comprise a second indication that the two or more stations are to consider a state of a wireless medium before transmitting, and wherein the clear to transmit message further comprises a third indication of a clear channel assessment threshold to be utilized by the two or more stations in considering the state of the wireless medium. In some aspects of the apparatus, the electronic hardware processor is further configured to determine one or more resource units for random access and include an indication of the one or more resource units in the clear to transmit message, and the receiver is further configured to receive random access uplink data based on the one or more resource units.

In some aspects of the apparatus, the electronic hardware processor is further configured to generate the clear to transmit message to comprise a second indication of a packet type to be utilized by the two or more stations for the plurality of uplink data transmissions and a third indication of whether associated or unassociated stations may transmit during the uplink transmission opportunity. In some aspects of the apparatus, the electronic hardware processor is further configured to generate the clear to transmit message to comprise a second indication of a transmit power of the clear to transmit message and a target receive power for the plurality of uplink data transmissions.

Another aspect disclosed is a method for wireless communication. The method includes generating, via an electronic hardware processor, a clear to transmit message indicating an uplink transmission opportunity and a request for two or more stations to concurrently transmit uplink data at a specific time, transmitting, via the electronic hardware processor, the clear to transmit message to the two or more stations; and receiving, via the electronic hardware processor, a plurality of uplink data transmissions at the specific time from at least two stations of the two or more stations. In some aspects, the method also includes generating the clear to transmit message to further include a common information field including information common to all of the two or more stations, and two or more individual information fields corresponding to each of the two or more stations respectively. In some aspects, the method also includes generating the clear to transmit message to further include a duration field of nine bits indicating a number of OFDM symbols to be used for the plurality of uplink data transmissions. In some aspects, the method also includes generating the clear to transmit message to further include an indication of whether the two or more stations are to include packet extension symbols at an end of the plurality of uplink data transmissions. In some aspects, the method also includes generating the clear to transmit message to further include a second indication that the two or more stations are to consider a state of a wireless medium before transmitting, and a third indication of a clear channel assessment threshold to be utilized by the two or more stations in considering the state of the wireless medium. In some aspects, the method also includes determining one or more resource units for random access, transmitting an indication of the one or more resource units in the clear to transmit message, and receiving random access uplink data based on the one or more resource units.

In some aspects, the method also includes generating the clear to transmit message to further include an indication of a packet type to be utilized by the two or more stations for the plurality of uplink data transmissions, and wherein the clear to transmit message further comprises an indication of whether associated or unassociated stations may transmit during the uplink transmission opportunity. In some aspects, the method also includes generating the clear to transmit message to further include an indication of a transmit power of the clear to transmit message and a target receive power for the plurality of uplink data transmissions.

Another aspect disclosed is an apparatus for wireless communication. The apparatus includes means for generating a clear to transmit message indicating an uplink transmission opportunity, the clear to transmit message further comprising a request for two or more stations to concurrently transmit uplink data at a specific time, means for transmitting the clear, transmit message to the two or more stations; and means for receiving a plurality of uplink data transmissions at the specific time from at least two stations of the two or more stations. In some aspects of the apparatus, the means for generating is configured to generate the clear to transmit message to include a common information field including information common to all of the two or more stations and to generate the clear to transmit message to also include two or more individual information fields corresponding to each of the two or more stations respectively. In some aspects of the apparatus, the means for generating is configured to generate the clear to transmit message to include a duration field of nine bits indicating a number of OFDM symbols to be used for the plurality of uplink data transmissions. In some aspects of the apparatus, the means for generating is configured to generate the clear to transmit message to include an indication of whether the two or more stations are to include packet extension symbols at an end of the plurality of uplink data transmissions. In some aspects of the apparatus, the means for generating is configured to generate the clear to transmit message to include a second indication that the two or more stations are to consider a state of a wireless medium before transmitting, and is also configured to generate the clear to transmit message to include a third indication of a clear channel assessment threshold to be utilized by the two or more stations in considering the state of the wireless medium. Some aspects of the apparatus include means for determining one or more resource units for random access, means for transmitting an indication of the one or more resource units in the clear to transmit message and means for receiving random access uplink data based on the one or more resource units.

In some aspects of the apparatus, the means for generating is configured to generate the clear to transmit message to include a second indication of a packet type to be utilized by the two or more stations for the plurality of uplink data transmissions, and wherein the means for generating is also configured to generate the clear to transmit message to further include a third indication of whether associated or unassociated stations may transmit during the uplink transmission opportunity. In some aspects of the apparatus, the means for generating is configured to generate the clear to transmit message to include an indication of a transmit power of the clear to transmit message and a target receive power for the plurality of uplink data transmissions.

Another aspect disclosed is a non-transitory computer-readable medium comprising instructions that when executed cause a processor to perform a method. The method may include generating a clear to transmit message indicating an uplink transmission opportunity, the clear to transmit message further comprising a request for two or more stations to concurrently transmit uplink data at a specific time, transmitting the clear to transmit message to the two or more stations; and receiving a plurality of uplink data transmissions at the specific time from at least two stations of the two or more stations.

In some aspects, the clear to transmit message is further generated to comprises a common information field including information common to all of the two or more stations, and wherein the clear to transmit message further comprises two or more individual information fields corresponding to each of the two or more stations respectively. In some aspects, the clear to transmit message is further generated to comprise a duration field of nine bits indicating a number of OFDM symbols to be used for the plurality of uplink data transmissions. In some aspects, the clear to transmit message is further generated to comprise an indication of whether the two or more stations are to include packet extension symbols at an end of the plurality of uplink data transmissions. In some aspects, the clear to transmit message is further generated to comprise a second indication that the two or more stations are to consider a state of a wireless medium before transmitting, and wherein the clear to transmit message further comprises a third indication of a clear channel assessment threshold to be utilized by the two or more stations in considering the state of the wireless medium. In some aspects, the method also includes determining one or more resource units for random access, transmitting an indication of the one or more resource units in the clear to transmit message; and receiving random access uplink data based on the one or more resource units.

In some aspects, the clear to transmit message is further generated to comprise an indication of a packet type to be utilized by the two or more stations for the plurality of uplink data transmissions, and wherein the clear to transmit message further comprises an indication of whether associated or unassociated stations may transmit during the uplink transmission opportunity. In some aspects, the clear to transmit message is further generated to comprise an indication of a transmit power of the clear to transmit message and a target receive power for the plurality of uplink data transmissions.

DETAILED DESCRIPTION

Figure 1:
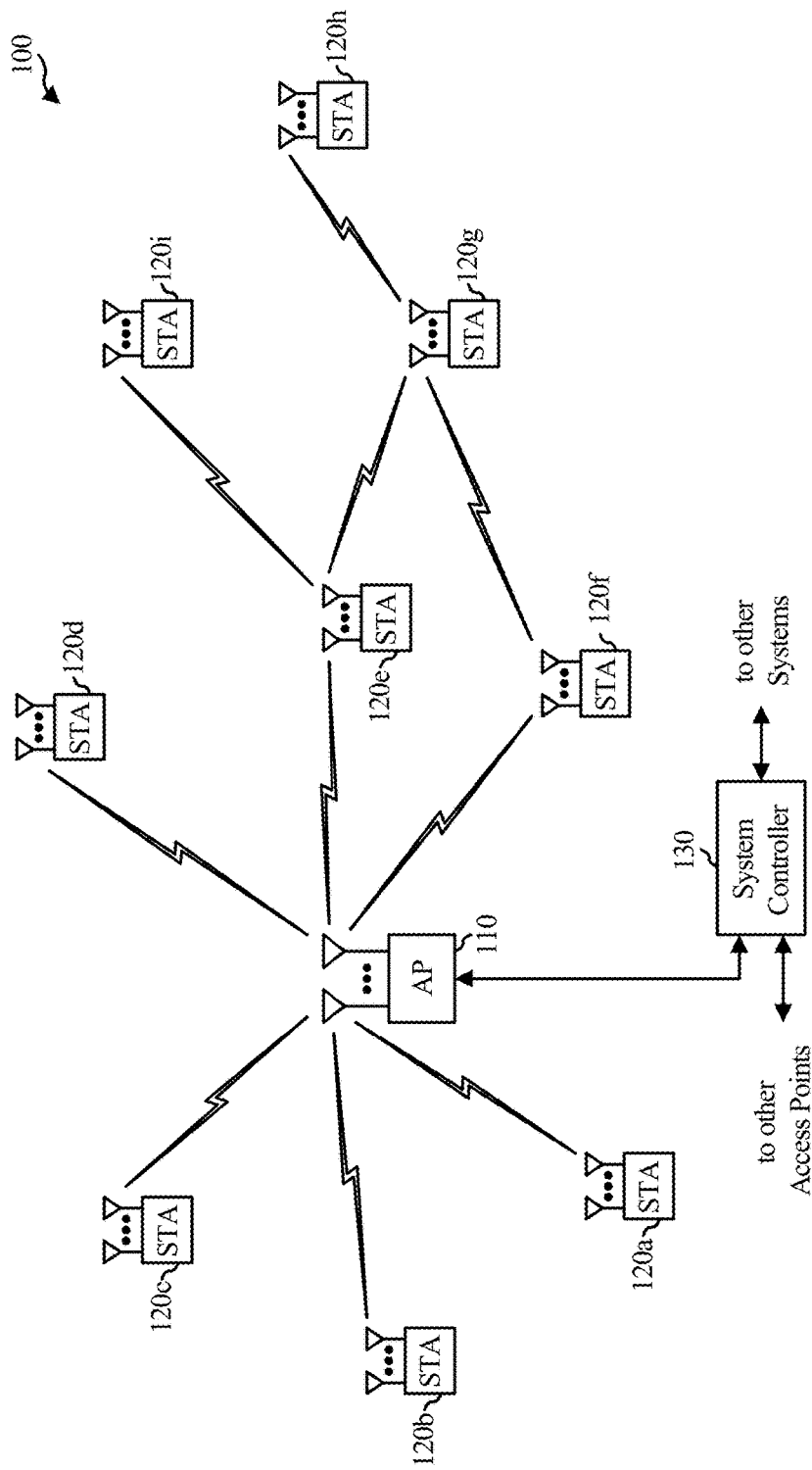
FIG. 1 illustrates a multiple-access multiple-input multiple-output (MIMO) system with access points and wireless stations.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple STAs. A TDMA system may allow multiple STAs to share the same frequency channel by dividing the transmission signal into different time slots, each time slot being assigned to different STA. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An AP may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A STA may also comprise, be implemented as, or known as a user terminal ("UT"), an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with APs and STAs. For simplicity, only one AP 110 is shown in FIG. 1. As described above, the AP 110 is generally a fixed STA that communicates with the STAs 120a-l (also referred to herein collectively as "the STAs 120" or individually as "the STA 120") and may also be referred to as a base station or using some other terminology. Also as described above, a STA 120 may be fixed or mobile and may also be referred to as a user terminal, a mobile station, a wireless device, or using some other terminology. The AP 110 may communicate with one or more STAs 120 at any given moment on the downlink or uplink. The downlink (i.e., forward link) is the communication link from the AP 110 to the STAs 120, and the uplink (i.e., reverse link) is the communication link from the STAs 120 to the AP 110. A STA 120 may also communicate peer-to-peer with another STA 120. A system controller 130 couples to and provides coordination and control for the APs.

While portions of the following disclosure will describe STAs 120 capable of communicating via Spatial Division Multiple Access (SDMA), for certain aspects, the STAs 120 may also include some STAs that do not support SDMA. Thus, for such aspects, the AP 110 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

The system 100 employs multiple transmit and multiple receive antennas for data transmission on the downlink and uplink. The AP 110 is equipped with $N_{ap}$ antennas and represents the multiple-input (MI) for downlink transmissions and the multiple-output (MO) for uplink transmissions. A set of K selected STAs 120 collectively represents the multiple-output for downlink transmissions and the multiple-input for uplink transmissions. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected STA may transmit user-specific data to and/or receive user-specific data from the AP. In general, each selected STA may be equipped with one or multiple antennas (i.e., $N_{ut} \geq 1$). The K selected STAs can have the same number of antennas, or one or more STAs may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, where each time slot may be assigned to a different STA 120.

Figure 2:
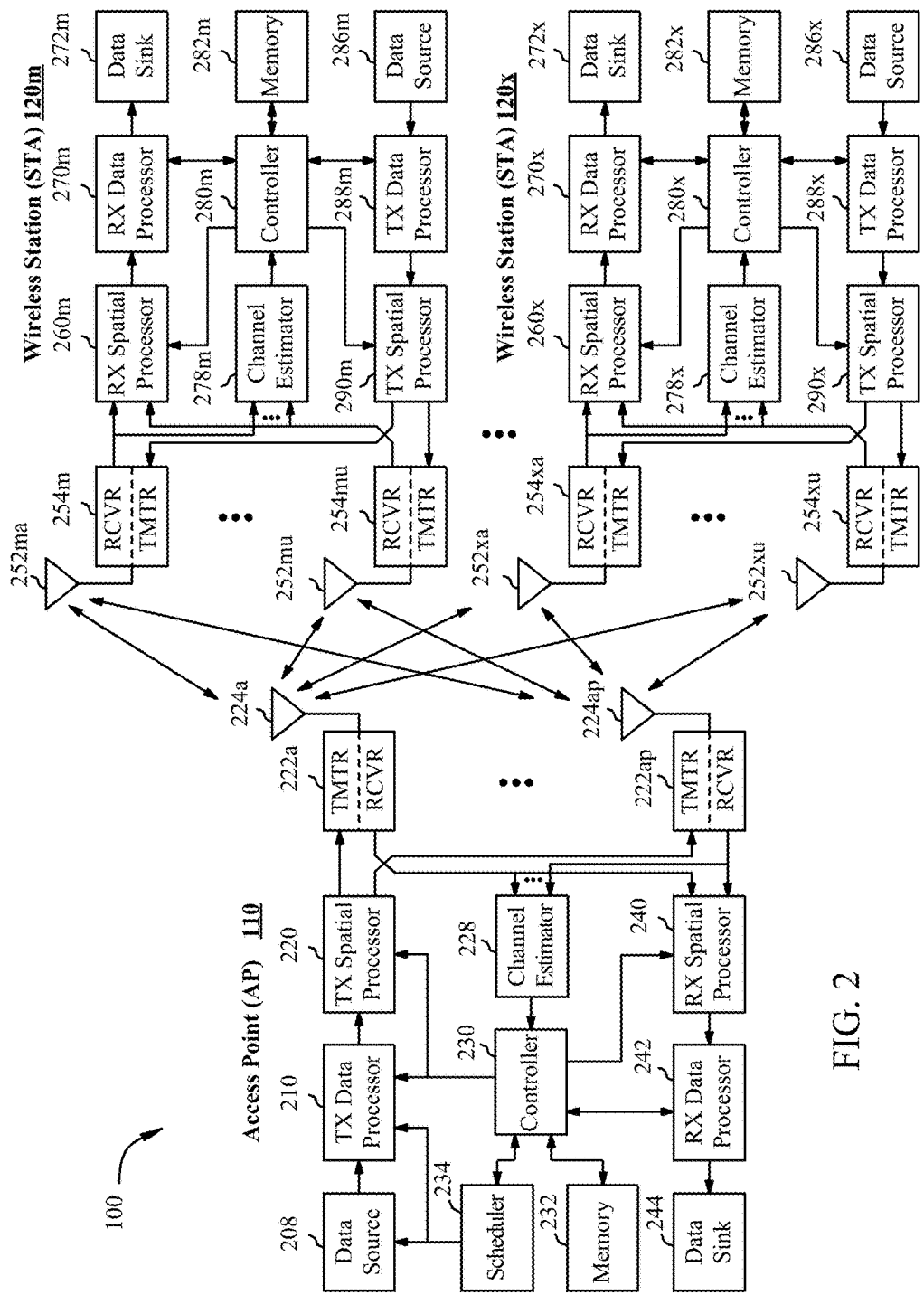
FIG. 2 illustrates a block diagram of an access point and two wireless stations in a MIMO system.

FIG. 2 illustrates a block diagram of the AP 110 and two STAs 120m and 120x in MIMO system 100. The AP 110 is equipped with $N_t$ antennas 224a through 224ap. The STA 120m is equipped with $N_{ut,m}$ antennas $252_{ma}$ through $252_{mu}$, and the STA 120x is equipped with $N_{ut,x}$ antennas $252_{xa}$ through $252_{xu}$. The AP 110 is a transmitting entity for the downlink and a receiving entity for the uplink. The STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ STAs are selected for simultaneous transmission on the uplink, and $N_{dn}$ STAs are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the AP 110 and/or the STA 120.

On the uplink, at each STA 120 selected for uplink transmission, a TX data processor 288 receives traffic data from a data source 286 and control data from a controller 280. The TX data processor 288 processes (e.g., encodes, interleaves, and modulates) the traffic data for the STA based on the coding and modulation schemes associated with the rate selected for the STA and provides a data symbol stream.

A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the AP 110.

$N_{up}$ STAs may be scheduled for simultaneous transmission on the uplink. Each of these STAs may perform spatial processing on its respective data symbol stream and transmit its respective set of transmit symbol streams on the uplink to the AP 110.

At the AP 110, $N_{up}$ antennas 224a through $224_{ap}$ receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing.

On the downlink, at the AP 110, a TX data processor 210 receives traffic data from a data source 208 for $N_{dn}$ STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. The TX data processor 210 provides $N_{dn}$ downlink data symbol streams for the $N_{dn}$ STAs. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the STAs 120.

At each STA 120, $N_{ut,m}$ antennas 252 receive the $N_{up}$ downlink signals from the AP 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the STA based on the downlink channel response matrix $H_{dn,m}$ for that STA. Controller 230 derives the spatial filter matrix for the AP based on the effective uplink channel response matrix $H_{up,eff}$. The controller 280 for each STA may send feedback information (e.g., the downlink and/or uplink eigenvectors, eigenvalues, SNR estimates, and so on) to the AP 110. The controllers 230 and 280 may also control the operation of various processing units at the AP 110 and STA 120, respectively.

Figure 3:
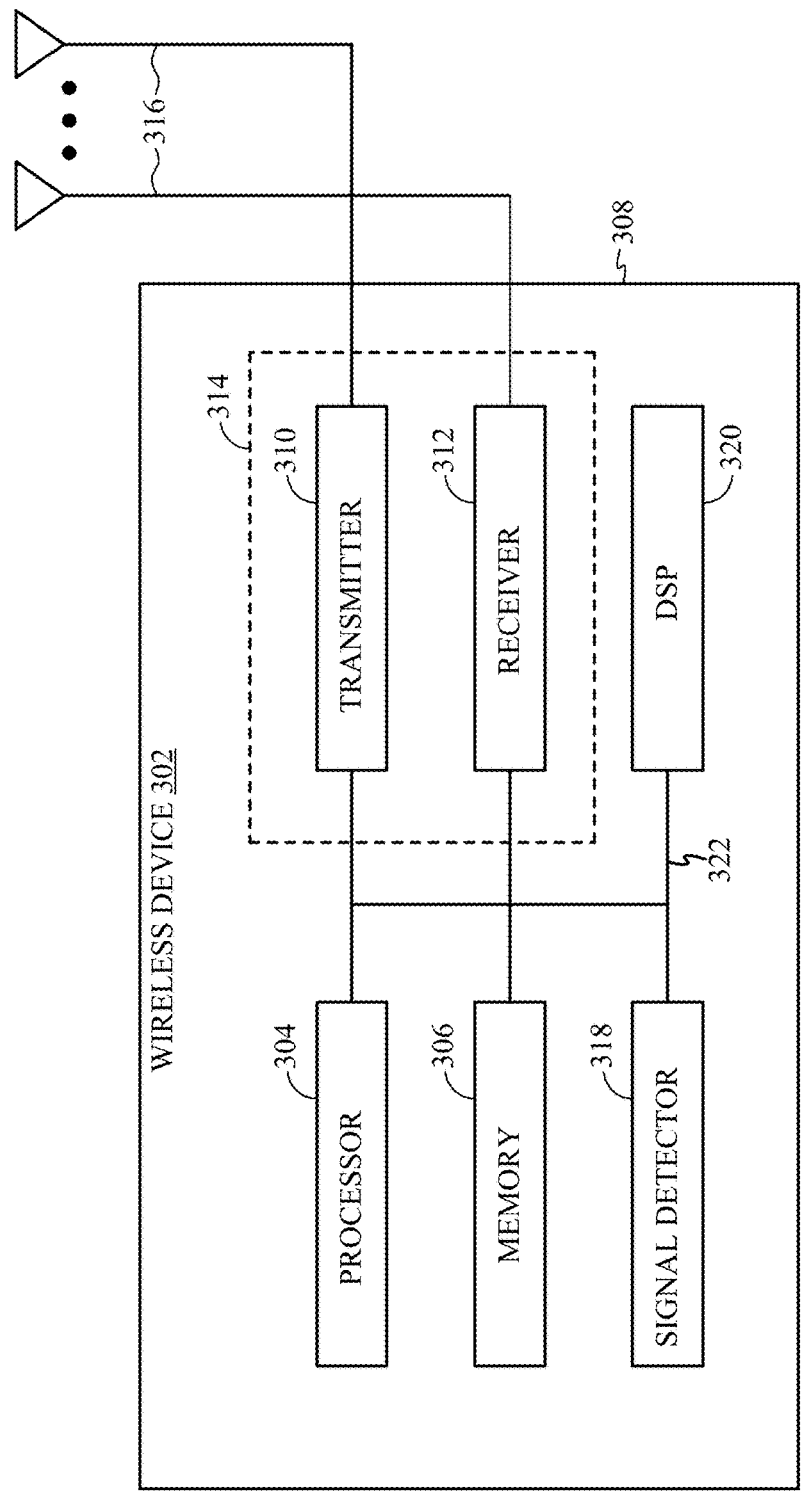
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an AP 110 or a STA 120.

The wireless device 302 may include an electronic hardware processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more electronic hardware processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple STAs to an AP. In some embodiments, the UL signal may be transmitted in a multi-user MIMO (MU-MIMO) system. Alternatively, the UL signal may be transmitted in a multi-user FDMA (MU-FDMA) or similar FDMA system. Specifically, FIGS. 4-8, and 10 illustrate UL-MU-MIMO transmissions 410A, 410B, 1050A, and 1050B that would apply equally to UL-FDMA transmissions. In these embodiments, UL-MU-MIMO or UL-FDMA transmissions can be sent simultaneously from multiple STAs to an AP and may create efficiencies in wireless communication.

An increasing number of wireless and mobile devices put increasing stress on bandwidth requirements that are demanded for wireless communications systems. With limited communication resources, it is desirable to reduce the amount of traffic passing between the AP and the multiple STAs. For example, when multiple terminals send uplink communications to the AP, it is desirable to minimize the amount of traffic to complete the uplink of all transmissions. Thus, embodiments described herein support utilizing communication exchanges, scheduling and certain frames for increasing throughput of uplink transmissions to the AP.

Figure 4A:
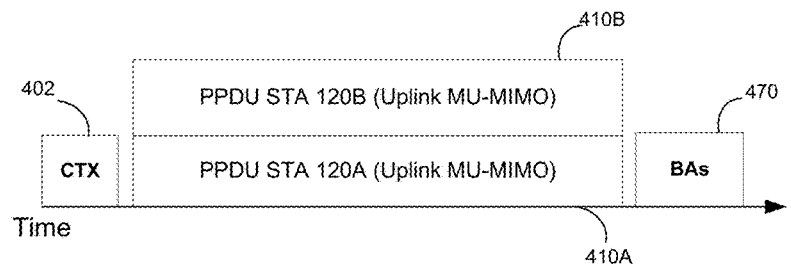
FIG. 4A shows a time diagram of an example frame exchange of an uplink (UL) MU-MIMO communication.

FIG. 4A is a time sequence diagram illustrating an example of an UL-MU-MIMO protocol 400 that may be used for UL communications. As shown in FIG. 4A and in conjunction with FIG. 1, the AP 110 may transmit a clear to transmit (CTX) message 402 to the STAs 120 indicating which STAs may participate in the UL-MU-MIMO scheme, such that a particular STA knows to start an UL-MU-MIMO. In some embodiments, the CTX message may be transmitted in a payload portion of a physical layer convergence protocol (PLCP) protocol data units (PPDUs). An example of a CTX frame structure is described more fully below with reference to FIGS. 12-15.

Once a STA 120 receives a CTX message 402 from the AP 110 where the STA is listed, the STA may transmit the UL-MU-MIMO transmission 410. In FIG. 4A, STA 120A and STA 120B transmit UL-MU-MIMO transmission 410A and 410B containing physical layer convergence protocol (PLCP) protocol data units (PPDUs). Upon receiving the UL-MU-MIMO transmission 410, the AP 110 may transmit block acknowledgments (BAs) 470 to the STAs 120.

Figure 4B:
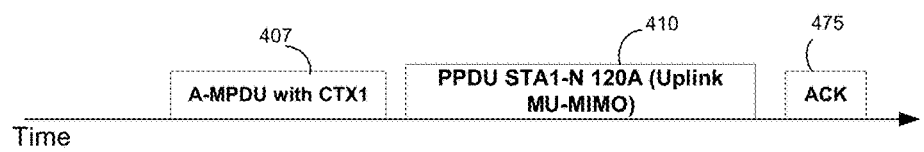
FIG. 4B shows a time diagram of an example frame exchange of an uplink (UL) MU-MIMO communication.

FIG. 4B is a time sequence diagram illustrating an example of an UL-MU-MIMO protocol that may be used for UL communications. In FIG. 4B, a CTX frame is aggregated in an aggregated MAC protocol data unit (A-MPDU) message 407. The A-MPDU message 407 may provide time to a STA 120 for processing before transmitting the UL signals or may allow the AP 110 to send data to the STAs 120s before receiving uplink data.

Not all APs or STAs 120 may support UL-MU-MIMO or UL-FDMA operation. A capability indication from a STA 120 may be indicated in a high efficiency wireless (HEW) capability element that is included in an association request or probe request and may include a bit indicating capability, the maximum number of spatial streams a STA 120 can use in a UL-MU-MIMO transmission, the frequencies a STA 120 can use in a UL-FDMA transmission, the minimum and maximum power and granularity in the power backoff, and the minimum and maximum time adjustment a STA 120 can perform.

A capability indication from an AP may be indicated in a HEW capability element that is included in an association response, beacon or probe response and may include a bit indicating capability, the maximum number of spatial streams a single STA 120 can use in a UL-MU-MIMO transmission, the frequencies a single STA 120 can use in a UL-FDMA transmission, the required power control granularity, and the required minimum and maximum time adjustment a STA 120 should be able to perform.

In one embodiment, capable STAs 120 may request to a capable AP to be part of the UL-MU-MIMO (or UL-FDMA) protocol by sending a management frame to AP indicating request for enablement of the use of UL-MU-MIMO feature. In one aspect, an AP 110 may respond by granting the use of the UL-MU-MIMO feature or denying it. Once the use of the UL-MU-MIMO is granted, the STA 120 may expect a CTX message 402 at a variety of times. Additionally, once a STA 120 is enabled to operate the UL-MU-MIMO feature, the STA 120 may be subject to follow a certain operation mode. If multiple operation modes are possible, an AP may indicate to the STA 120 which mode to use in a HEW capability element, a management frame, or in an operation element. In one aspect the STAs 120 can change the operation modes and parameters dynamically during operation by sending a different operating element to the AP 110. In another aspect the AP 110 may switch operation modes dynamically during operation by sending an updated operating element or a management frame to a STA 120 or in a beacon. In another aspect, the operation modes may be indicated in the setup phase and may be setup per STA 120 or for a group of STAs 120. In another aspect the operation mode may be specified per traffic identifier (TID).

Figure 5:
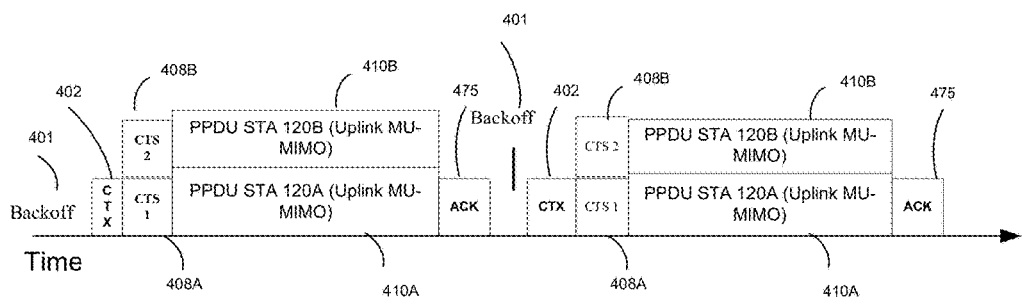
FIG. 5 shows a time diagram of another example frame exchange of an UL-MU-MIMO communication.

FIG. 5 is a time sequence diagram that, in conjunction with FIG. 1, illustrates an example of an operation mode of a UL-MU-MIMO transmission. In this embodiment, a STA 120 receives a CTX message 402 from an AP 110 and sends an immediate response to the AP 110. The response may be in the form of a clear to send (CTS) 408 or another similar signal. In one aspect, requirement to send a CTS may be indicated in the CTX message 402 or may be indicated in the setup phase of the communication. As shown in FIG. 5, STA 120 A and STA 120B may transmit a CTS 1 408A and CTS 2 408B message in response to receiving the CTX message 402. The modulation and coding scheme (MCS) of the CTS 1 408A and CTS 2 408B may be based on the MCS of the CTX message 402. In this embodiment, CTS 1 408A and CTS 2 408B contain the same bits and the same scrambling sequence so that they may be transmitted to the AP 110 at the same time. The duration field of the CTS 408 signals may be based on the duration field in the CTX by removing the time for the CTX PPDU. The UL-MU-MIMO transmission 410A and 410B are then sent by the STAs 120A and 120B as listed in the CTX 402 signals. The AP 110 may then send acknowledgment (ACK) signals the STAs 120A and 120B. In some aspects, the ACK signals may be serial ACK signals to each station or BAs. In some aspects the ACKs may be polled. This embodiment creates efficiencies by simultaneously transmitting CTS 408 signals from multiple STAs to an AP 110 instead of sequentially, which saves time and reduces the possibility of interference.

Figure 6:
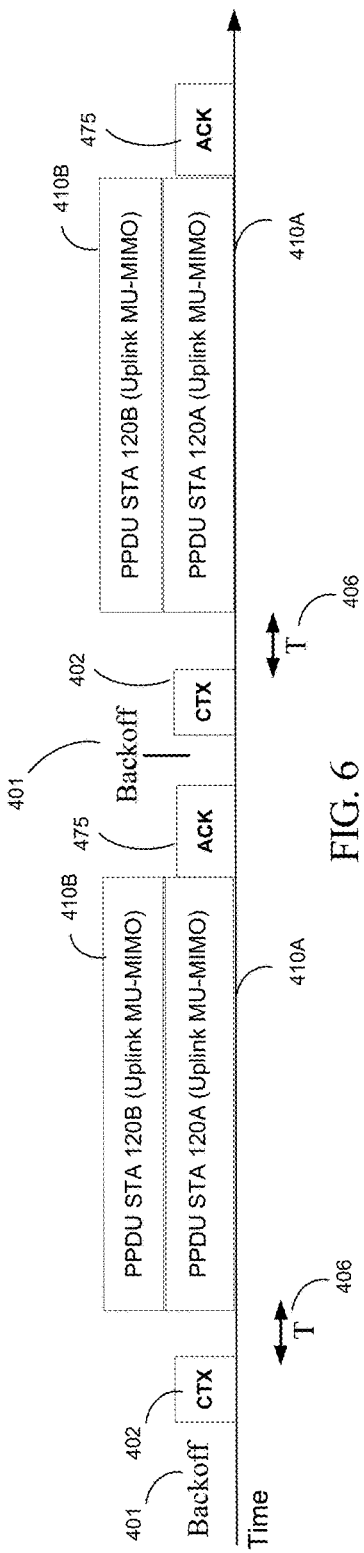
FIG. 6 shows a time diagram of another example frame exchange of an UL-MU-MIMO communication.

FIG. 6 is a time sequence diagram that, in conjunction with FIG. 1, illustrates another example of an operation mode of a UL-MU-MIMO transmission. In this embodiment, STAs 120A and 120B receive a CTX message 402 from an AP 110 and are allowed to start and UL-MU-MIMO transmission a time (T) 406 after the end of the PPDU carrying the CTX message 402. The T 406 may be a short interframe space (SIFS), point interframe space (PIFS), or another time potentially adjusted with additional offsets as indicated by an AP 110 in the CTX message 402 or via a management frame. The SIFS and PIFS time may be fixed in a standard or indicated by an AP 110 in the CTX message 402 or in a management frame. The benefit of T 406 may be to improve synchronization or to allow a STAs 120A and 120B time to process the CTX message 402 or other messages before transmission.

Referring to FIGS. 4-6, in conjunction with FIG. 1, the UL-MU-MIMO transmission 410 may have a common duration. The duration of the UL-MU-MIMO transmission 410 for STAs utilizing the UL-MU-MIMO feature may be indicated in the CTX message 402 or during the setup phase. To generate a PPDU of the required duration, a STA 120 may build a PLCP service data unit (PSDU) so that the length of the PPDU matches the length indicated in the CTX message 402. In another aspect, a STA 120 may adjust the level of data aggregation in a media access control (MAC) protocol data unit (A-MPDU) or the level of data aggregation in a MAC service data units (A-MSDU) to approach the target length. In another aspect, a STA 120 may add end of file (EOF) padding delimiters to reach the target length. In another approach the padding or the EOF pad fields are added at the beginning of the A-MPDU. One of the benefits of having all the UL-MU-MIMO transmissions the same length is that the power level of the transmission will remain constant.

In some embodiments, a STA 120 may have data to upload to the AP but the STA 120 has not received a CTX message 402 or other signal indicating that the STA 120 may start a UL-MU-MIMO transmission.

Figure 7:
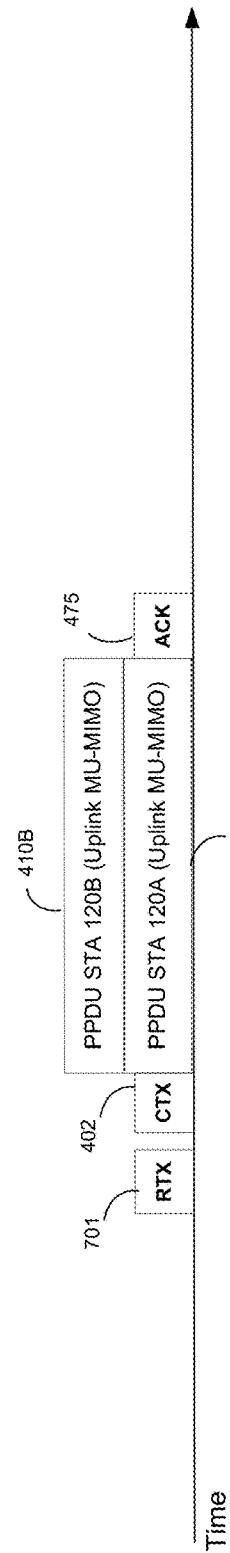
FIG. 7 shows a time diagram of another example frame exchange of an UL-MU-MIMO communication.

In one operation mode, the STAs 120 may not transmit outside an UL-MU-MIMO transmission opportunity (TXOP) (e.g., after CTX message 402). In another operation mode STAs 120 may transmit frames to initialize a UL-MU-MIMO transmission, and then may transmit during the UL-MU-MIMO TXOP, if for example, they are instructed to do so in a CTX message 402. In one embodiment, the frame to initialize a UL-MU-MIMO transmission may be a request to transmit (RTX), a frame specifically designed for this purpose (an example of a RTX frame structure is described more fully below with reference to FIGS. 8 and 9). The RTX frames may be the only frames a STA 120 is allowed to use to initiate a UL MU MIMO TXOP. In one embodiment, the STA may not transmit outside an UL-MU-MIMO TXOP other than by sending an RTX. In another embodiment, a frame to initialize an UL MU MIMO transmission may be any frame which indicates to an AP 110 that a STA 120 has data to send. It may be pre-negotiated that these frames indicate a UL MU MIMO TXOP request. For example, the following may be used to indicate that a STA 120 has data to send and is requesting an UL MU MIMO TXOP: a request-to-send (RTS), a data frame or quality of service (QoS) Null frame with bits 8-15 of the QoS control frame set to indicate more data, or a power save (PS) poll. In one embodiment, the STA may not transmit outside an UL MU MIMO TXOP other than by sending frames to trigger this TXOP, where this frame may be an RTS, PS poll, or QOS null. In another embodiment, the STA may send single user uplink data as usual, and may indicate a request for a UL MU MIMO TXOP by setting bits in the QoS control frame of its data packet. FIG. 7 is a time sequence diagram illustrating, in conjunction with FIG. 1, an example where the frame to initialize a UL-MU-MIMO is a RTX 701. In this embodiment the STA 120 sends to the AP 110 a RTX 701 that includes information regarding the UL-MU-MIMO transmission. As shown in FIG. 7, the AP 110 may respond to the RTX 701 with a CTX message 402 granting an UL-MU-MIMO TXOP to send the UL-MU-MIMO transmission 410 immediately following the CTX message 402. In another aspect, the AP 110 may respond with a CTS that grants a single-user (SU) UL TXOP. In another aspect, the AP 110 may respond with a frame (e.g., ACK or CTX with a special indication) that acknowledges the reception of the RTX 701 but does not grant an immediate UL-MU-MIMO TXOP. In another aspect, the AP 110 may respond with a frame that acknowledges the reception of the RTX 701, does not grant an immediate UL-MU-MIMO TXOP, but grants a delayed UL-MU-MIMO TXOP and may identify the time of the TXOP is granted. In this embodiment, the AP 110 may send a CTX message 402 to start the UL-MU-MIMO at the granted time.

In another aspect, the AP 110 may respond to the RTX 701 with an ACK or other response signal which does not grant the STA 120 an UL-MU-MIMO transmission but indicates that the STA 120 shall wait for a time (T) before attempting another transmission (e.g., sending another RTX). In this aspect the time (T) may be indicated by the AP 110 in the setup phase or in the response signal. In another aspect an AP 110 and a STA 120 may agree on a time which the STA 120 may transmit a RTX 701, RTS, PS-poll, or any other request for a UL-MU-MIMO TXOP.

In another operation mode, STAs 120 may transmit requests for UL-MU-MIMO transmissions 410 in accordance with regular contention protocol. In another aspect, the contention parameters for STAs 120 using UL-MU-MIMO are set to a different value than for other STAs that are not using the UL-MU-MIMO feature. In this embodiment, the AP 110 may indicate the value of the contention parameters in a beacon, association response or through a management frame. In another aspect, the AP 110 may provide a delay timer that prevents a STA 120 from transmitting for a certain amount of time after each successful UL-MU-MIMO TXOP or after each RTX, RTS, PS-poll, or QoS null frame. The timer may be restarted after each successful UL-MU-MIMO TXOP. In one aspect, the AP 110 may indicate the delay timer to STAs 120 in the setup phase or the delay timer may be different for each STA 120. In another aspect, the AP 110 may indicate the delay timer in the CTX message 402 or the delay timer may be dependent on the order of the STAs 120 in the CTX message 402, and may be different for each terminal.

In another operational mode, the AP 110 may indicate a time interval during which the STAs 120 are allowed to transmit a UL-MU-MIMO transmission. In one aspect, the AP 110 indicates a time interval to the STAs 120 during which the STAs are allowed to send a RTX or RTS or other request to the AP 110 to ask for an UL-MU-MIMO transmission. In this aspect, the STAs 120 may use regular contention protocol. In another aspect, the STAs may not initiate a UL-MU-MIMO transmission during the time interval but the AP 110 may send a CTX or other message to the STAs to initiate the UL-MU-MIMO transmission.

In certain embodiments, a STA 120 enabled for UL-MU-MIMO may indicate to an AP 110 that it requests an UL-MU-MIMO TXOP because it has data pending for UL. In one aspect, the STA 120 may send a RTS or a PS-poll to request a UL-MU-MIMO TXOP. In another embodiment, the STA 120 may send any data frame, including a quality of service (QoS) null data frame, where the bits 8-15 of the QoS control field indicate a non-empty queue. In this embodiment the STA 120 may determine during the setup phase which data frames (e.g., RTS, PS-poll, QoS null, etc.) will trigger a UL-MU-MIMO transmission when the bits 8-15 of the QoS control field indicate a non-empty queue. In one embodiment, the RTS, PS-poll, or QoS null frames may include a 1 bit indication allowing or disallowing the AP 110 to respond with a CTX message 402. In another embodiment, the QoS null frame may include TX power information and a per TID queue information. The TX power information and per TID queue information may be inserted in the two bytes of the sequence control and QoS controls fields in a QoS null frame and the modified QoS null frame may be sent to the AP 110 to request a UL-MU-MIMO TXOP. In another embodiment, referring to FIGS. 1 and 7, the STA 120 may send a RTX 701 to request a UL-MU-MIMO TXOP.

In response to receiving an RTS, RTX, PS-poll or QoS null frame, or other trigger frame as described above, an AP 110 may send a CTX message 402. In one embodiment, referring to FIG. 7, after the transmission of the CTX message 402 and the completion of the UL-MU-MIMO transmissions 410A and 410B, TXOP returns to the STAs 120A and 120B which can decide on how to use the remaining TXOP. In another embodiment, referring to FIG. 7, after the transmission of the CTX message 402 and the completion of the UL-MU-MIMO transmissions 410A and 410B, TXOP remains with the AP 110 and the AP 110 may use the remaining TXOP for additional UL-MU-MIMO transmissions by sending another CTX message 402 to either STAs 120A and 120B or to other STAs.

Figure 8:
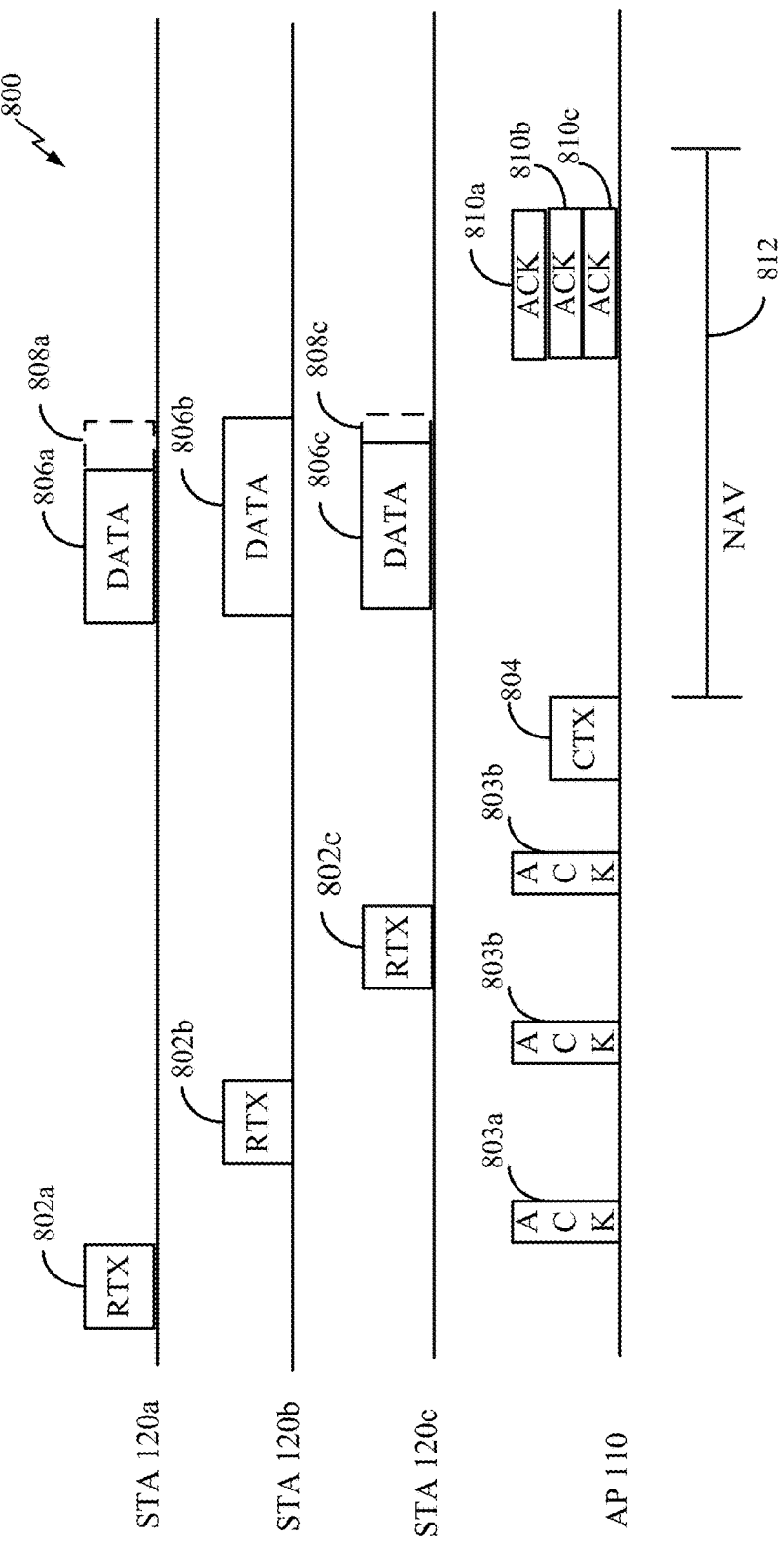
FIG. 8 is a message timing diagram of one embodiment of multi-user uplink communication.

FIG. 8 is a message timing diagram of one embodiment of multi-user uplink communication. Message exchange 800 shows communication of wireless messages between an AP 110 and three stations 120*a-c*. Message exchange 800 indicates that each of STAs 120*a-c* transmits a request-to-transmit (RTX) message 802*a-c* to the AP 110. Each of RTX messages 802*a-c* indicate that the transmitting station 120*a-c* has data available to be transmitted to the AP 110.

After receiving each of RTX messages 802*a-c*, the AP 110 may respond with a message indicating that the AP 110 has received the RTX. As shown in FIG. 8, the AP 110 transmits ACK messages 803*a-c* in response to each RTX messages 802*a-c*. In some embodiments, the AP 110 may transmit a message (e.g., a CTX message) indicating that each of the RTX messages 802*a-c* has been received but that the AP 110 has not granted a transmission opportunity for the stations 120*a-c* to uplink data. In FIG. 8, after sending ACK message 803*c*, the AP 110 transmits a CTX message 804. In some aspects, the CTX message 804 is transmitted to at least the stations STA 120*a-c*. In some aspects, the CTX message 804 is broadcast. In some aspects, the CTX message 804 indicates which stations are granted permission to transmit data to the AP 110 during a transmission opportunity. The starting time of the transmission opportunity and its duration may be indicated in the CTX message 804 in some aspects. For example, the CTX message 804 may indicate that the stations STA 120*a-c* should set their network allocation vectors to be consistent with network allocation vector (NAV) 812.

At a time indicated by the CTX message 804, the three stations 120*a-c* transmit data 806*a-c* to the AP 110. The data 806*a-c* are transmitted at least partially concurrently during the transmission opportunity. The transmissions of data 806*a-c* may utilize uplink multi-user multiple input, multiple output transmissions (UL-MU-MIMO) or uplink frequency division multiple access (UL-FDMA).

In some aspects, stations STAa-c may transmit pad data such the transmissions of each station transmitting during a transmission opportunity are of approximately equal duration. Message exchange 800 shows STA 120*a* transmitting pad data 808*a* while STA 120*c* transmits pad data 808*c*. The transmission of pad data ensure that the transmissions from each of the STAs 120*a-c* complete at approximately the same time. This may provide for a more equalized transmission power over the entire duration of the transmission, optimizing AP 110 receiver efficiencies.

After the AP 110 receives the data transmissions 806*a-c*, the AP 110 transmits acknowledgments 810*a-c* to each of the stations 120*a-c*. In some aspects, the acknowledgments 810*a-c* may be transmitted at least partially concurrently using either DL-MU-MIMO or DL-FDMA.

Figure 9:
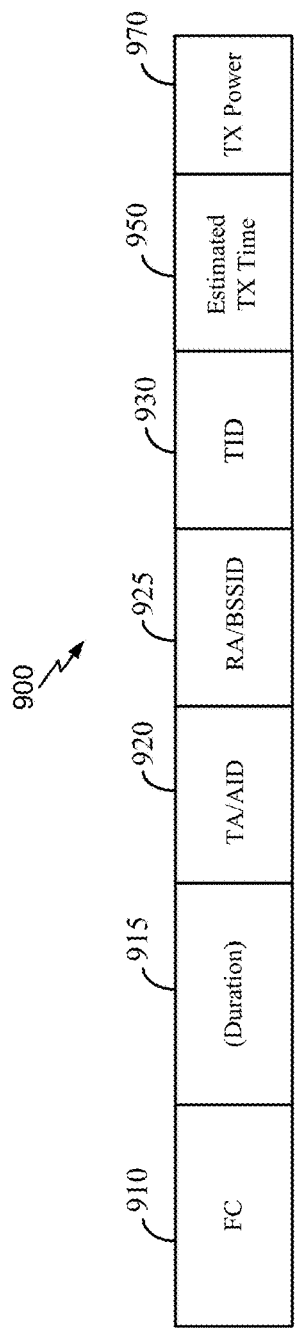
FIG. 9 shows a diagram of one embodiment of a request to transmit (RTX) frame.

FIG. 9 is a diagram of one embodiment of a RTX frame 900. The RTX frame 900 includes a frame control (FC) field 910, a duration field 915 (optional), a transmitter address (TA)/allocation identifier (AID) field 920, a receiver address (RA)/basic service set identifier (BSSID) field 925, a TID field 930, an estimated transmission (TX) time field 950, and a TX power field 970. The FC field 910 indicates a control subtype or an extension subtype. The duration field 915 indicates to any receiver of the RTX frame 900 to set the NAV. In one aspect, the RTX frame 900 may not have a duration field 915. The TA/AID field 920 indicates the source address which can be an AID or a full MAC address. The RA/BSSID field 925 indicates the RA or BSSID of the STAs to concurrently transmit uplink data. In one aspect the RTX frame may not contain a RA/BSSID field 925. The TID field 930 indicates the access category (AC) for which the user has data. The Estimated TX time field 950 indicates the time requested for the UL-TXOP and may be the time required for a STA 120 to send all the data in its buffer at the current planned MCS. The TX power field 970 indicates the power at which the frame is being transmitted and can be used by the AP to estimate the link quality and adapt the power backoff indication in a CTX frame.

In some embodiments, before an UL-MU-MIMO communication can take place, an AP 110 may collect information from the STAs 120 that may participate in the UL-MU-MIMO communication. An AP 110 may optimize the collection of information from the STAs 120 by scheduling the transmissions from the STAs 120.

Figure 10:
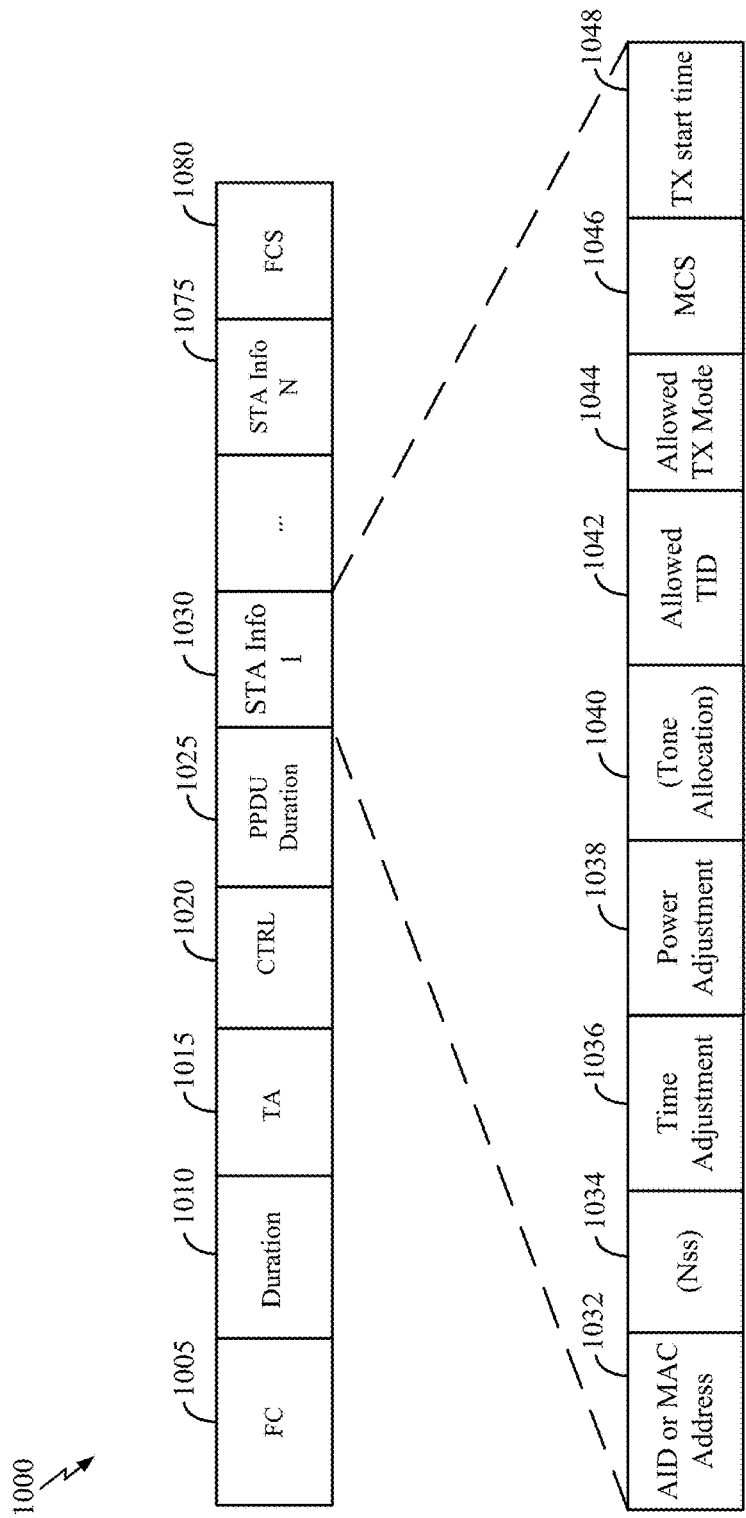
FIG. 10 shows a diagram of one embodiment of a clear to transmit (CTX) frame.

As discussed above, the CTX message 402 may be used in a variety of communications. FIG. 10 is a diagram of an example of a CTX frame 1000 structure. In this embodiment, the CTX frame 1000 is a control frame that includes a frame control (FC) field 1005, a duration field 1010, a transmitter address (TA) field 1015, a control (CTRL) field 1020, a PPDU duration field 1025, a STA information (info) field 1030, and a frame check sequence (FCS) field 1080. The FC field 1005 indicates a control subtype or an extension subtype. The duration field 1010 indicates to any receiver of the CTX frame 1000 to set the NAV. The TA field 1015 indicates the transmitter address or a BSSID. The CTRL field 1020 is a generic field that may include information regarding the format of the remaining portion of the frame (e.g., the number of STA info fields and the presence or absence of any subfields within a STA info field), indications for rate adaptation for the STAs 120, indication of allowed TID, and indication that a CTS must be sent immediately following the CTX frame 1000. The indications for rate adaptation may include data rate information, such as a number indicating how much the STA should lower their MCSs, compared to the MCS the STA would have used in a single user transmission. The CTRL field 1020 may also indicate if the CTX frame 1000 is being used for UL MU MIMO or for UL FDMA or both, indicating whether a Nss or Tone allocation field is present in the STA Info field 1030.

Alternatively, the indication of whether the CTX is for UL MU MIMO or for UL FDMA can be based on the value of the subtype. Note that UL MU MIMO and UL FDMA operations can be jointly performed by specifying to a STA both the spatial streams to be used and the channel to be used, in which case both fields are present in the CTX; in this case, the Nss indication is referred to a specific tone allocation. The PPDU duration 1025 field indicates the duration of the following UL-MU-MIMO PPDU that the STAs 120 are allowed to send. The STA Info 1030 field contains information regarding a particular STA and may include a per-STA (per STA 120) set of information (see STA Info 1 1030 and STA Info N 1075). The STA Info 1030 field may include an AID or MAC address field 1032 which identifies a STA, a number of spatial streams field (Nss) 1034 field which indicates the number of spatial streams a STA may use (in an UL-MU-MIMO system), a Time Adjustment 1036 field which indicates a time that a STA should adjust its transmission compared to the reception of a trigger frame (the CTX in this case), a Power Adjustment 1038 field which indicates a power backoff a STA should take from a declared transmit power, a Tone Allocation 1040 field which indicates the tones or frequencies a STA may use (in a UL-FDMA system), an Allowed TID 1042 field which indicates the allowable TID, an Allowed TX Mode 1044 field which indicates the allowed TX modes, a MCS 1046 field which indicates the MCS the STA should use, and a TX start time field 1048 which indicates a start time for the STA to transmit uplink data. In some embodiments, the allowed TX modes may include a short/long guard interval (GI) or cyclic prefix mode, a binary convolutional code (BCC)/low density parity check (LDPC) mode (generally, a coding mode), or a space-time block coding (STBC) mode.

In some embodiments, the STA info fields 1030-1075 may be excluded from the CTX frame 1000. In these embodiments, the CTX frame 1000 with the missing STA info fields may indicate to the STAs 120 receiving the CTX frame 1000 that a request message to uplink data (e.g., RTS, RTX or QoS Null) has been received but a transmission opportunity has not been granted. In some embodiments, the control field 1020 may include information regarding the requested uplink. For example, the control field 1020 may include a waiting time before sending data or another request, a reason code for why the request was not granted, or other parameters for controlling medium access from the STA 120. A CTX frame with missing STA info fields may also apply to CTX frames 1100, 1200, 1300, or 1400 described below.

In some embodiments, a STA 120 receiving a CTX with a Allowed TID 1042 indication may be allowed to transmit data only of that TID, data of the same or higher TID, data of the same or lower TID, any data, or only data of that TID first, then if no data is available, data of other TIDs. The FCS 1080 field indicates the carries an FCS value used for error detection of the CTX frame 1000.

Figure 11:
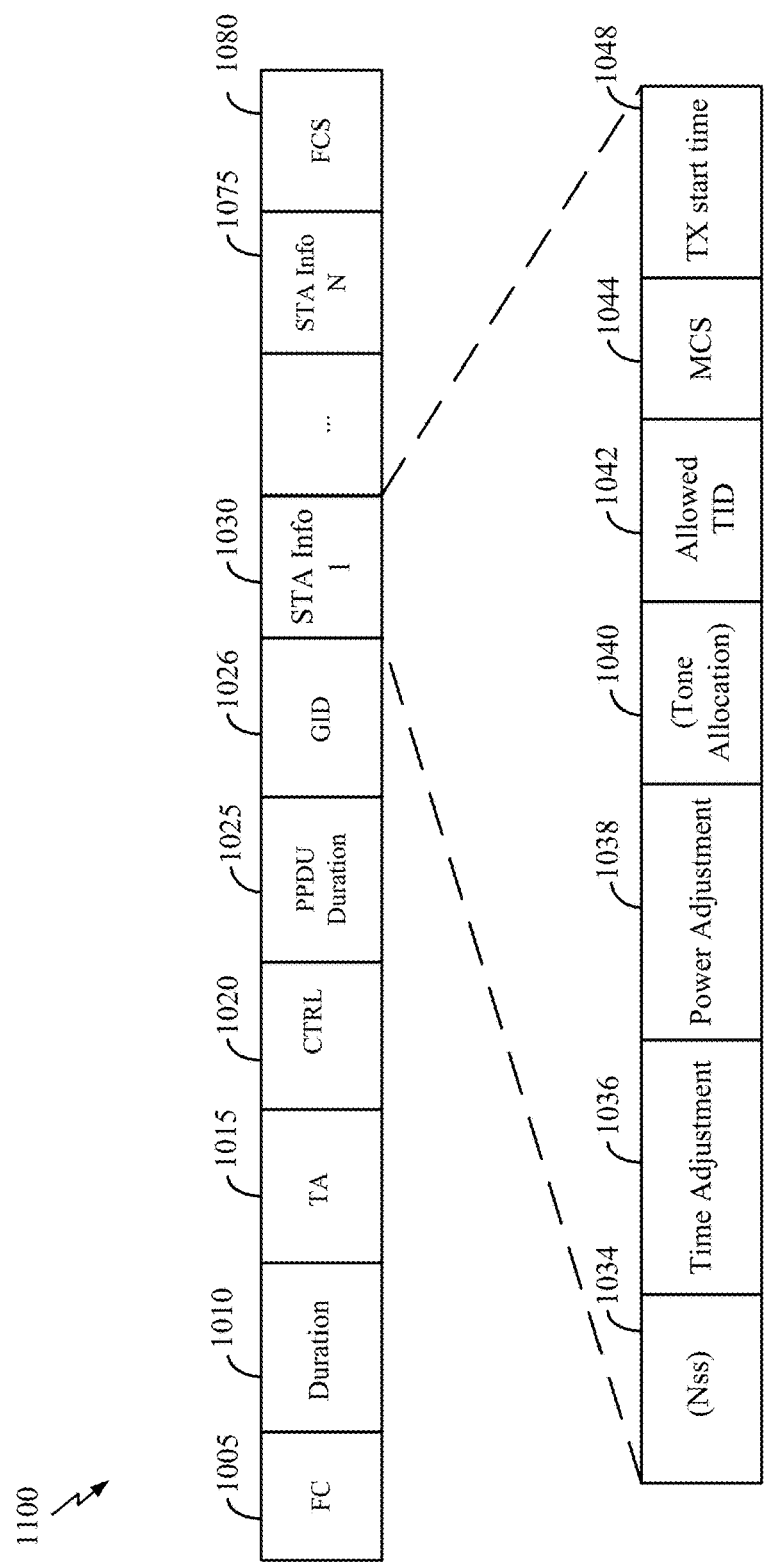
FIG. 11 shows a diagram of another embodiment of a CTX frame.
Figure 12:
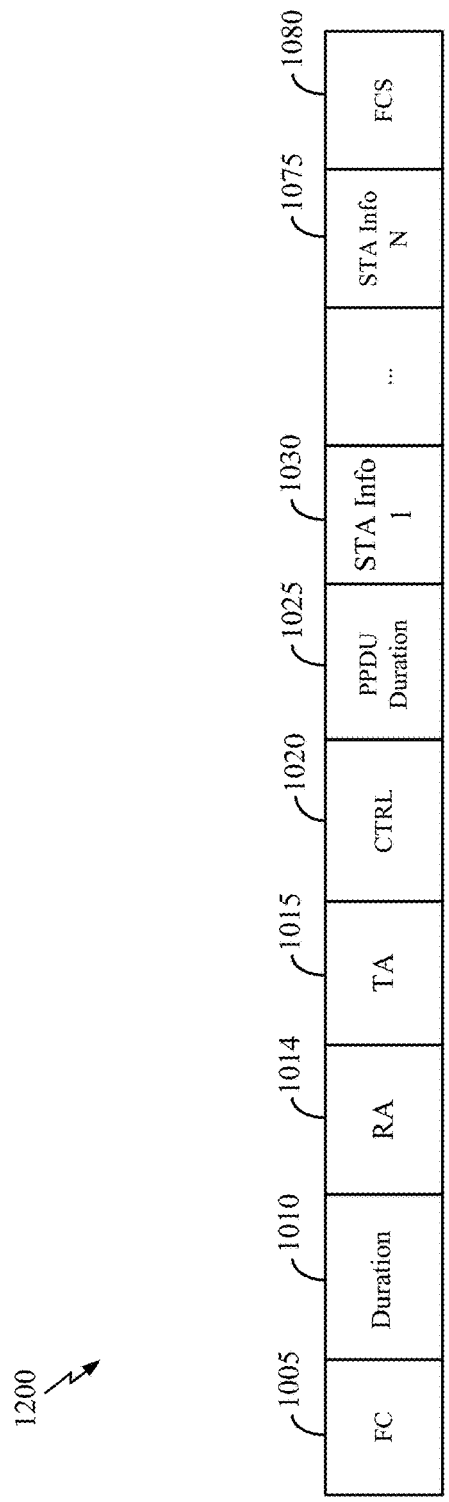
FIG. 12 shows a diagram of another embodiment of a CTX frame.

FIG. 11 is a diagram of another example of a CTX frame 1100 structure. In this embodiment and in conjunction with FIG. 10, the STA Info 1030 field does not contain the AID or MAC Address 1032 field and instead the CTX frame 1000 includes a group identifier (GID) 1026 field which identifies the STAs to concurrently transmit uplink data by a group identifier rather than an individual identifier. FIG. 12 is a diagram of another example of a CTX frame 1200 structure. In this embodiment and in conjunction with FIG. 11, the GID 1026 field is replaced with a RA 1014 field which identifies a group of STAs through a multicast MAC address.

Figure 13:
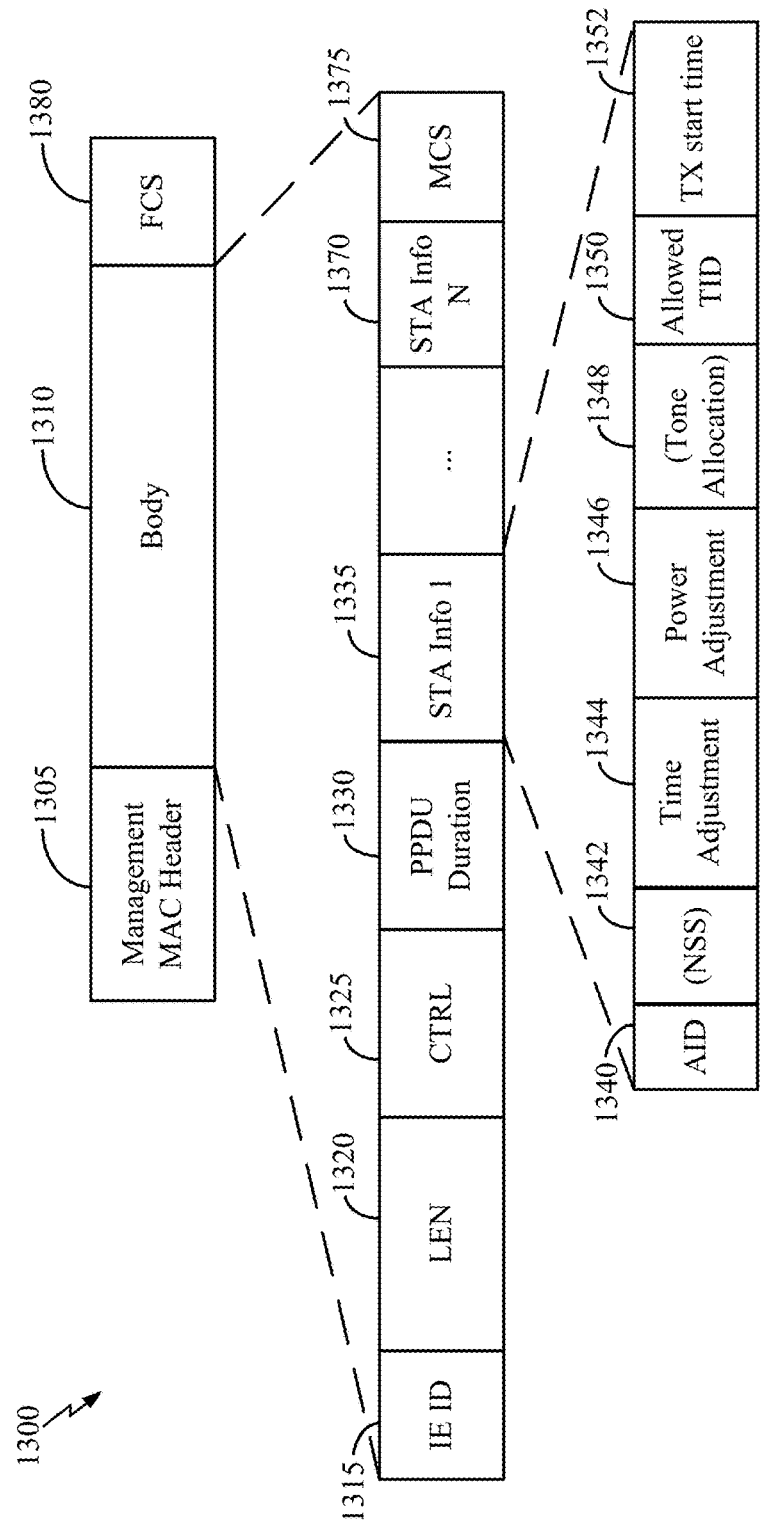
FIG. 13 shows a diagram of another embodiment of a CTX frame.

FIG. 13 is a diagram of an example of a CTX frame 1300 structure. In this embodiment, the CTX frame 1300 is a management frame that includes a Management MAC Header 1305 field, a Body 1310 field, and a FCS 1380 field. The Body 1310 field includes an IE ID 1315 field which identifies an information element (IE), a LEN 1320 field which indicates the length of the CTX frame 1300, a CTRL 1325 field which includes the same information as the CTRL 1020 field, a PPDU Duration 1330 field which indicates the duration of the following UL-MU-MIMO PPDU that the STAs 120 are allowed to send, a STA Info 1 1335 field and a MCS 1375 field which can indicate the MCS for all the STAs to use in the following UL-MU-MIMO transmission, or an MCS backoff for all the STAs to use in the following UL-MU-MIMO transmission. The STA Info 1 1335 (along with STA Info N 1370) field represent a per STA field that includes AID 1340 field which identifies a STA, a number of spatial streams field (Nss) 1342 field which indicates the number of spatial streams a STA may use (in an UL-MU-MIMO system), a Time Adjustment 1344 field which indicates a time that a STA should adjust its transmission time compared to the reception of a trigger frame (the CTX in this case), a Power Adjustment 1348 field which indicates a power backoff a STA should take from a declared transmit power, a Tone Allocation 1348 field which indicates the tones or frequencies a STA may use (in a UL-FDMA system), an Allowed TID 1350 field which indicates the allowable TID, and a TX start time field 1048 which indicates a start time for the STA to transmit uplink data.

In one embodiment, the CTX frame 1000 or the CTX frame 1300 may be aggregated in an A-MPDU to provide time to a STA 120 for processing before transmitting the UL signals. In this embodiment, padding or data may be added after the CTX to allow a STA 120 additional time to process the forthcoming packet. One benefit to padding a CTX frame may be to avoid possible contention issues for the UL signals from other STAs 120, as compared to increasing the interframe space (IFS) as described above. In one aspect, if the CTX is a management frame, additional padding information elements (IEs) may be sent. In one aspect, if the CTX is aggregated in a A-MPDU, additional A-MPDU padding delimiters may be included. Padding delimiters may EoF delimiters (4 Bytes) or other padding delimiters. In another aspect, the padding may be achieved by adding data, control or Management MPDPUs, as long as they do not require to be processed within the IFS response time. The MPDUs may include an indication indicating to the receiver that no immediate response is required and will not be required by any of the following MPDUs. In another aspect, the STAs 120 may request to an AP 110 a minimum duration or padding for the CTX frame. In another embodiment, the padding may be achieved by adding PHY OFDMA symbols, which may include undefined bits not carrying information, or may include bit sequences that carry information, as long as they do not need to be processed within the IFS time.

In some embodiments, an AP 110 may initiate a CTX transmission. In one embodiment, an AP 110 may send a CTX message 402 in accordance with regular enhanced distribution channel access (EDCA) contention protocol. In another embodiment, an AP 110 may send a CTX message 402 at scheduled times. In this embodiment, the scheduled times may be indicated by the AP 110 to the STAs 120 by using a restricted access window (RAW) indication in a beacon which indicates a time reserved for a group of STAs 120 to access the medium, a target wake time (TWT) agreement with each STA 120 which indicates to multiple STAs 120 to be awake at the same time to take part in a UL-MU-MIMO transmission, or information in other fields. Outside the RAW and TWT a STA 120 may be allowed to transmit any frame, or only a subset of frames (e.g., non-data frames). It may also be forbidden to transmit certain frames (e.g., it may be forbidden to transmit data frames). The STA 120 may also indicate that it is in sleep state. One advantage to scheduling a CTX is that multiple STAs 120 may be indicated a same TWT or RAW time and may receive a transmission from an AP 110.

Figure 14:
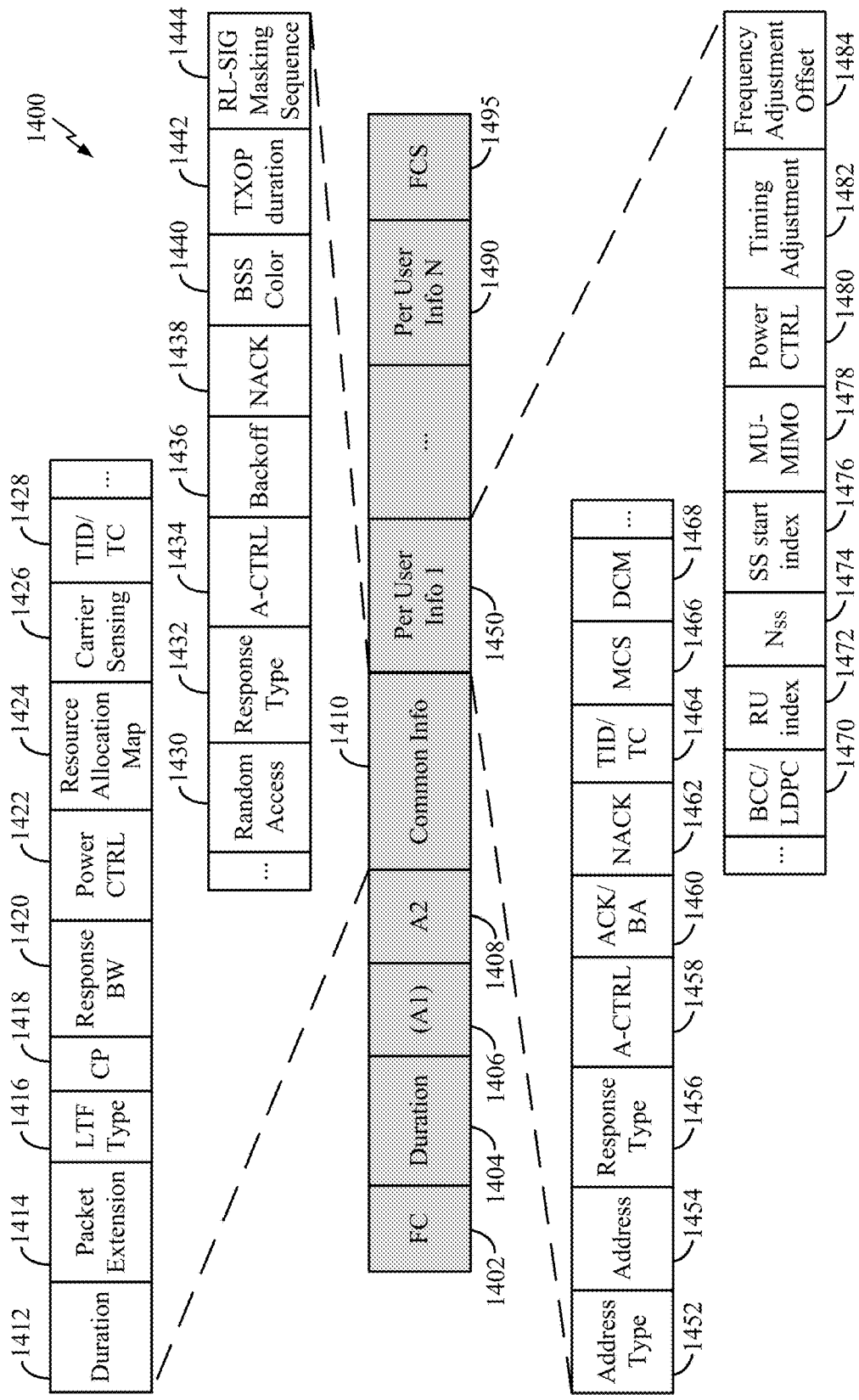
FIG. 14 shows a diagram of another embodiment of a CTX frame.

FIG. 14 is a diagram of an example of a CTX frame 1400 structure. The CTX frame 1400 may be transmitted by an AP to one or more STAs, such as AP 110 and one or more of the STAs 120a-i of FIG. 1. For example, the CTX frame 1400 may be transmitted in accordance with one or more of the timing diagrams of FIG. 4A, 4B, or 5-8. In various embodiments, the CTX frame 1400 may be transmitted to one or more STAs 120 to provide the parameters for uplink response message(s) that will be transmitted by the one or more STAs 120 in response to the CTX frame 1400. As illustrated, the CTX frame 1400 comprises a FC field 1402, a duration field 1404, a first address ("A1") field 1406, a second address ("A2") field 1408, a common information field 1410, per user info fields 1450-1490, and an FCS field 1495.

The FC field 1402 can indicate a control subtype or an extension subtype. The duration field 1404 can indicate to a receiver of the CTX frame 1400 to set the NAV based on an indicated value. The A1 field 1406 can indicate an address, a BSSID, or other identifier of the device or devices (e.g., a group of STAs) intended to receive the CTX message, such as one or more of the STAs 120. In some aspects, the A1 field 1406 may be optional, such as when the CTX frame 1400 is broadcast. The A2 field 1408 can indicate an address, a BSSID, or other identifier of the device transmitting the CTX message, such as the AP 110.

The common information field 1410 may include information regarding the format of the remaining portion of the frame (e.g., the number of STA info fields and the presence or absence of any subfields within a STA info field), indication(s) for rate adaptation for the STAs 120, indication(s) of allowed TID, indication(s) that a CTS must be sent immediately following the CTX frame 1400, etc. For example, as illustrated, the common information field 1410 can comprise a duration field 1412, a packet extension field 1414, an LTF type field 1416, a cyclic prefix (CP) field 1418, a response bandwidth (BW) field 1420, a power control field 1422, a resource allocation map field 1424, a carrier sensing field 1426, a TID/traffic class (TC) field 1428, a random access field 1430, a response type field 1432, an aggregated control field 1434, a backoff field 1436, a negative acknowledgment (NACK) field 1438, a BSS-Color field 1440, a TXOP duration field 1442, and an RL-SIG Masking sequence field 1444. In some aspect, the duration field 1412, the packet extension field 1414, the LTF type field 1416, the CP field 1418, the response BW field 1420, the power control field 1422, and the resource allocation map field 1424 may be referred to as PHY parameters. In some aspects, some of these parameter can be used by the STAs 120 to form the uplink response packet (e.g., an UL MU PPDU), and/or may be included in a SIG-A field of the uplink response packet. Additionally or alternatively, in some aspects, the CTX frame 1400 may include a field indicating an exact value to be utilized in the SIG-A field. In accordance with these aspects, STAs 120 can simply copy the contents of the field into the transmitted SIG-A in the uplink response message. In some aspects, this mode can simplify STAs' 120 operation and can also facilitate updates of the SIG-A content format. In some aspects, the carrier sensing field 1426, the TID/TC field 1428, the random access field 1430, the response type field 1432, the aggregated control field 1434, the backoff field 1436, and the NACK field 1438 may be referred to as MAC parameters. Although all of these field are illustrated as being part of the common information field 1410, only a portion of these fields may be present in a given embodiment, additional fields may exist, and the ordering of the fields may be rearranged.

The duration field 1412 may indicate the number of OFDM symbols of the response PSDU from the STAs 120 (e.g., an uplink packet). In some aspects, the duration field 1412 may be nine bits in length. In another aspect the duration field 1412 may be nine bits. In other aspects, the duration field 1412 may be more or less than nine bits in length. In some aspects, the OFDM symbols may be 16 µs, such as the symbol duration in IEEE 802.11ax. In other aspects, the OFDM symbols may be 4 µs, such as the symbol duration in IEEE 802.11ac. In accordance with these aspects, a trigger may be utilized for eliciting non-high efficiency (HE) single user (SU) PPDUs without loss due to padding. In another aspect, the duration field 1412 may include a value for each STA to copy in to a length field of an L-SIG field if the uplink response message (e.g., UL MU PPDU). In accordance with this aspect, the duration field 1412 may be set according to rules defined for the setting of the length field in a L-SIG field, according to one or more of the 802.11 specifications. In various aspects, the duration field 1412 may indicate the duration in symbols of an MPDU or PPDU to be received from the STAs 120 (e.g., an uplink packet). The packet extension field 1414 can indicate whether a STA 120 has to account for or include packet extension (PE) symbols at the end of a response PPDU, or otherwise utilize a PE technique. In some embodiments, PE may allow for devices receiving packets to have additional processing time to accurately process the information contained in the packet. In some aspects, the packet extension field 1414 may indicate one or more of an a-factor, a LDPC extra symbol, or a PE duration. The a-factor may be similar to the a-factor described in U.S. Provisional App. No. 62/189,170. In some aspects, the a-factor may be three bits or less in length. The LDPC extra symbol may be one bit in length, and may be used to indicate whether an additional symbol for LDPC should be utilized in the uplink response message by the STA. The PE duration may be three bits in length, and may indicate a duration of an extension to be added to the end of an uplink packet transmitted by the STAs 120. In some aspects, the PE duration may be one or 0 µs, 4 µs, 8 µs, 12 µs, or 16 µs.

The LTF type field 1416 may indicate whether a long or a short LTF format is to be used for the uplink response message. In some aspects the LTF type field 1416 may additionally or alternatively indicate the total duration or length of the LTFs to be used for the uplink response message. An indication of the total duration of the LTF(s) may be useful, as one or more of the STAs 120 may use a different number of spatial streams, and it can be beneficial if the number of LTFs (or the total duration) are the same across STAs 120. The CP field 1418 may be two bits in length, and may indicate a duration of a CP to be used in the uplink response message. In some aspects, there may be three different CP modes. The response BW field 1420 may indicate what portion of the BW should be utilized by the STAs 120 for a legacy preamble of the uplink response message. In some aspects, the indicated portion may be the entire BW available, or some portion thereof.

The power control field 1422 may indicate one or more of the AP's 110 transmission power (e.g., in dBm) or a target receive power. In some aspects, a STA 120 may utilize some of this information, in addition to an estimated received strength of the CTX frame 1400, and may calculate/estimate a transmission power required to reach the AP 110. In some aspects, a STA 120 may estimate the minimum transmit power required to reach the AP 110 at the target receive power. The resource allocation map field 1424 may define a resource allocation for the STAs 120. For example, the resource allocation map field 1424 may indicate a correspondence between an ordered sequence of STAs and the corresponding allocated frequency resource units (RU). In an aspect, the resource allocation map field 1424 can be a high-level indication that a mapping is used, and the order can be indicated in the per user info fields 1450-1490.

The carrier sensing field 1426 may indicate whether the STAs 120 are to consider the channel state (e.g., physical and virtual carrier sensing) before responding with an uplink response message. For example, the carrier sensing field 1426 may comprise a one bit indication of whether the STAs 120 must sense whether the transmission medium is sufficiently free from transmissions. In some aspects, this sensing may be performed in accordance with energy detection techniques, packet detection techniques, or some other technique. In some aspects, the carrier sensing field may also indicate a clear channel assessment (CCA) threshold for the STAs 120. In accordance with these aspects, the STAs 120 may determine whether the medium is sufficiently free based at least in part on whether the strength of the information sensed over the medium is above or below the threshold.

The TID/TC field 1428 may indicate one or more of the traffic identifier or the traffic class that the STAs 120 must utilize for the uplink response message. The random access field 1430 may indicate that some of the resource units are allocated for random access. For example, in some embodiments, the AP 110 may provide one or more resource units for STAs to transmit information to the AP 110 in accordance with a contention-based protocol. The parameter for the random access RU may be indicated in the response type field 1432 or the per user info fields 1450-1490. The response type field 1432 may indicate a type or subtype of message/frame that must be transmitted by the STA 120 in the uplink response message. For example, the response type field 1432 may indicate that any MPDU type may be utilized, that each STA 120 must response with a legacy CTS, that each STA is to respond with an HE CTS response, or some combination thereof. If a random access RU is utilized, the response type field 1432 may indicate that only types of frames for which carrier sensing is not required may be used, that only frames that are retransmissions of previous filed transmissions within a certain time frame may be sent during the random access RU, that only certain types or subtypes of packets may be transmitted (e.g., only encrypted packets), that only associated STAs 120 may transmit during the random access RU, that only unassociated STAs 120 may transmit during the random access RU, a priority of devices (or device types), or some combination thereof. For example, during the random access RU, STAs 120 may transmit various types of frames, such as a PS-Poll/QoS null, data, a compressed beamforming report feedback, a legacy CTS, etc.

The aggregated control field 1434 may indicate the presence of additional aggregated (A) control field(s) or subfield(s). In some aspects, the aggregated control field 1434 may also indicate the type of A-control field present. In some aspects, the A-control subfield(s) may comprise channel quality indication (CQI) request parameters, buffer request parameters (e.g., a status request, which may only request information about the next buffered transmission, or may request information about all buffered transmissions by the STA 120), medium reuse parameters (e.g., CCA deferral thresholds, interference limits, SNR requirements, etc.), ACK/BA (e.g., if the CTX frame 1400 is unicast), or an indication that a tunneled direct link station (TDLS) may be utilized (e.g., for one STA 120 to transmit to another STA 120, and not just the AP 110).

The backoff field 1436 may indicate the backoff behavior for the STAs 120 after reception of the CTX frame 1400, or after the transmission of the uplink response message by the STA 120. For example, the backoff field 1436 may indicate whether the STAs 120 are to reset their backoff, keep their backoff, or may otherwise provide a new contention window value. In some aspects, backoffs may be utilized for fairness (e.g., fairness in access to the wireless medium). The NACK field 1438 may indicate whether the STAs 120 must send an MPDU, even if the STAs 120 have nothing to send (e.g., for the allowed response type). In some aspects, the STAs 120 which have nothing to send may transmit a quality of service (QoS) null packet. In some aspects, the STAs 120 may need to pad the MPDU sent in this case to reach a requested response duration. The BSS-Color field 1440 may indicate the AP 110 color or a multi-BSS color. The TXOP duration field 1442 may be used to set the NAV. The RL-SIG Masking sequence field 1444 may be used to indicate the type of masking to be applied in an RL-SIG field of the uplink response message.

As illustrated, the per user info fields 1450-1490 can each comprise an address type field 1452, an address field 1454, a response type field 1456, an aggregated control field 1458, an ACK/BA field 1460, a NACK field 1462, a TID/TC field 1464, an MCS field 1466, a dual carrier modulation (DCM) field 1468, a BCC/LDPC field 1470, an RU index field 1472, a number of spatial streams ($N_{SS}$) field 1474, a spatial stream start index 1476, an MU-MIMO field 1478, a power control field 1480, a timing adjustment field 1482, and a frequency offset adjustment field 1484. In some aspects, the address type field 1452, the address field 1454, the response type field 1456, the aggregated control field 1458, the ACK/BA field 1460, the NACK field 1462, and the TID/TC field 1464 may be referred to as MAC parameters. In some aspects, the MCS field 1466, the DCM field 1468, the BCC/LDPC field 1470, the RU index field 1472, the $N_{SS}$ field 1474, the spatial stream start index 1476, the MU-MIMO field 1478, the power control field 1480, the timing adjustment field 1482, and the frequency adjustment field 1484 may be referred to as the PHY parameters.

The address type field 1452 may comprise a one bit indication of whether the address field 1454 contains an AID or a MAC address of the identified STA 120. The address field 1454 can contain an AID, a MAC address, or a hash of a MAC address for a STA 120 that the information in the per user info field 1450 is intended for (hereinafter "the identified STA 120"). In some aspects, the address field 1454 may be twelve bits (or less) if an AID is utilized. In some aspects, the address field 1454 may be greater than or equal to twelve bits if a MAC address is utilized. In some aspects, a hash of a STA's 120 MAC address may be utilized for unassociated STAs 120, as there may not be an AID available.

The response type field 1456 may indicate the type of message/packet that the identified STA 120 is to utilize for the uplink response message. For example, the response type field 1456 may indicate that any MPDU type may be utilized, that only sounding feedback may be provided, that only PS-polls may be transmitted, or some combination thereof. The aggregated control field 1458 may indicate the presence of an A-control field. In some aspects, the A-control field may include one or more of a BA request (BAR), a CQI request, a buffer information request, channel state information (CSI) fragments/channels, or some combination thereof. In some aspects, the CSI fragments/channels may indicate the parameters to be used for a sounding feedback response. In some aspects, the aggregated control field 1458 may also indicate the type of A-control field present.

The ACK/BA field 1460 may indicate the ACK/BA types for fragmentation. The NACK field 1462 may indicate that NACK is requested, similar to the NACK field 1438 described above, but on an individual STA 120 basis. The TID/TC field 1464 may indicate one or more of the traffic identifier or the traffic class that the identified STA 120 must utilize for the uplink response message. The MCS field 1466 may indicate the MCS to be used by the identified STA 120 for the uplink response message. The DCM field 1468 may indicate the DCM to be used by the identified STA 120 when responding. The BCC/LDPC field 1470 may indicate the BCC/LDPC response coding type for the identified STA 120.

The RU index field 1472 may indicate the RU(s) allocated for the identified STA 120. In some aspects, the RU index field 1472 may indicate the log$_2$(#RUs), where #RUs represents the number of RUs allocated for the identified STA 120. In some aspects, the RU index may indicate a starting RU and indicate a number of contiguous RUs allocated for the identified STA 120. The N$_{SS}$ field 1474 may indicate the number of spatial streams allocated for the identified STA 120, and the spatial stream start index 1476 may indicate a starting index for the allocated spatial streams. The MU-MIMO field 1478 may indicate whether MU-MIMO is to be utilized. In some aspects, if MU-MIMO is not utilized, other related field may not be present within the CTX message, such as the power control field 1480. The power control field 1480 can indicate the transmission power of the identified STA 120 or an expected received power (by the AP 110) from the STA 120. In some aspects, the identified STA 120 may calculate its transmission power based at least in part on this information. The timing adjustment field 1482 may indicate a timing adjustment for the identified STA 120, which can allow the AP 110 to correct for different times of arrival across the STAs 120. The frequency offset adjustment field 1484 may indicate a frequency adjustment for the identified STA 120, which can allow the AP 110 to correct for different center frequency setting across the STAs 120. The per user info field 1490 may contain field similar to those described above, but may contain more or less fields depending upon the particular STA 120 identified. The FCS field 1495 can indicate an FCS value used for error detection of the CTX frame 1400.

Figure 15:
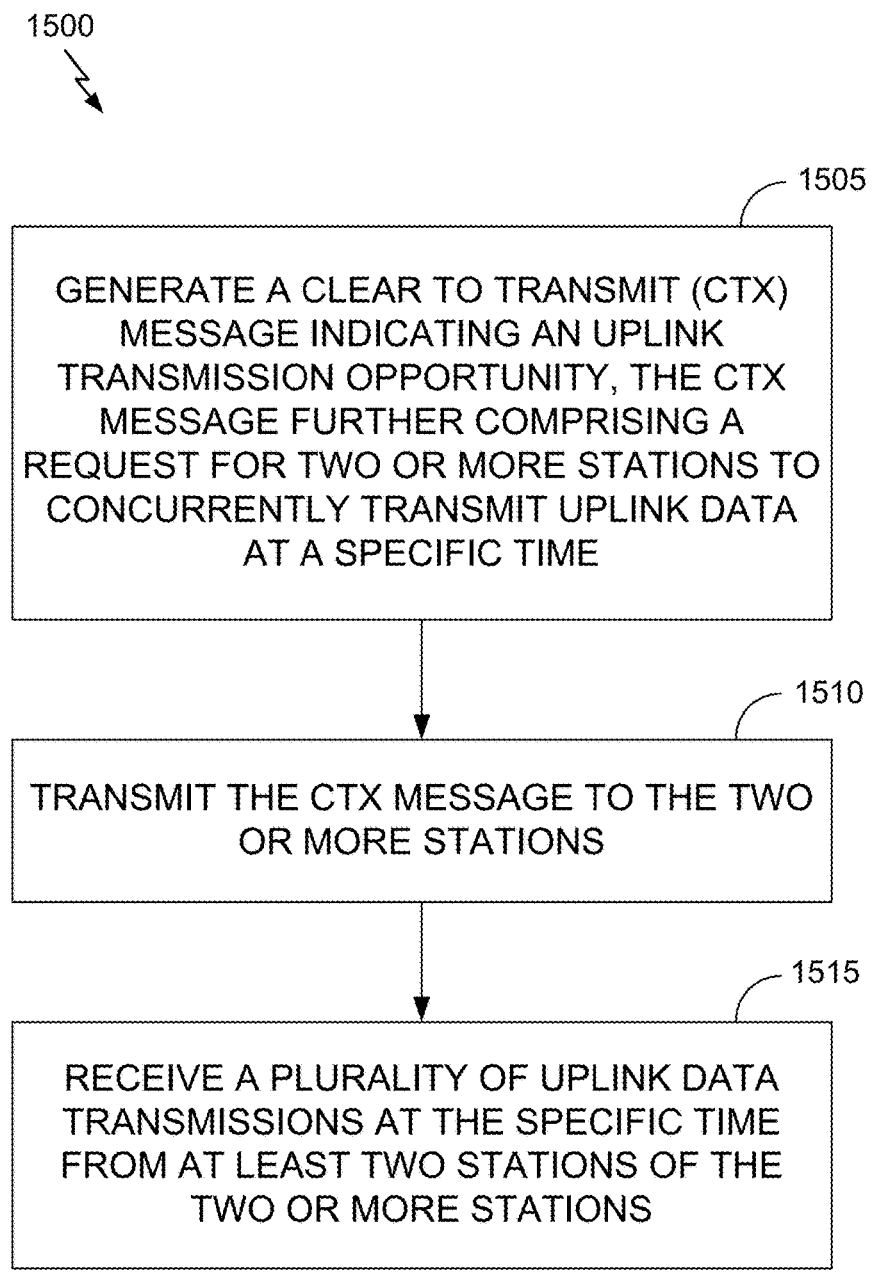
FIG. 15 is a flow chart of an aspect of an exemplary method for providing wireless communication.

FIG. 15 is a flow chart of an exemplary method 1500 for wireless communication in accordance with certain embodiments described herein. A person having ordinary skill in the art will appreciate that the method 1500 may be implemented by any suitable device and system. For example, method 1500 may be implemented by the AP 110 of FIG. 1.

In operation block 1505, the method 1500 includes generating a clear to transmit (CTX) message indicating an uplink transmission opportunity, the CTX message further comprising a request for two or more stations to concurrently transmit uplink data at a specific time. In some aspects, the two or more stations includes two or more of the STAs of FIG. 1. In an embodiment, the CTX message may be similar to the CTX frame 1400 of FIG. 14. In some aspects, the CTX message can comprise a common information field including information common to all of the two or more stations, and two or more individual information fields corresponding to each of the two or more stations respectively. In some aspects, the CTX message can comprise a duration field of nine bits indicating a number of OFDM symbols to be used for the plurality of uplink data transmissions. In some aspects, the CTX message can comprise an indication of whether the two or more stations are to include packet extension symbols at an end of the plurality of uplink data transmissions. In some aspects, the CTX message can comprise an indication that the two or more stations are to consider a state of a wireless medium before transmitting, and an indication of a clear channel assessment threshold to be utilized by the two or more stations in considering the state of the wireless medium. In some aspects, the CTX message can comprise an indication of a packet type to be utilized by the two or more stations for the plurality of uplink data transmissions, and an indication of whether associated or unassociated stations may transmit during the uplink transmission opportunity. In some aspects, the CTX message can comprise an indication of a transmit power of the CTX message and a target receive power for the plurality of uplink data transmissions. In some aspects, generating a clear to transmit message may include allocating a portion of memory for the message, and initializing the allocated memory in a format consistent with that of a CTX message, such as any of the message formats shown in FIGS. 10-14.

In operational block 1510, the method 1500 further includes transmitting the CTX message to the two or more stations. Transmitting the CTX message to two or more stations may include at least setting transmit address information of the CTX message to identify the two or more stations, for example, via a station or MAC address of the two or more stations. Transmitting the CTX message may also include invoking a transmit function in a network software driver or passing data to a network hardware chip, such as the transmitter 310. When the network software driver is invoked or data is passed to the network hardware chip, the portion of memory initialized in the message format of the CTX message may be identified to the network software driver or the network hardware chip, via an input parameter.

In operational block 1515, the method 1500 further includes receiving a plurality of uplink data transmissions at the specific time from at least two stations of the two or more stations. In some aspects, receiving a plurality of uplink data transmissions may include receiving a notification from a network hardware chip that one or more packets have been received from the network, and copying the packet data from the network hardware chip to a memory, such as memory 306 shown in FIG. 3.

In some aspects, the method 1500 may further comprise determining one or more resource units for random access, transmitting an indication of the one or more resource units in the CTX message, and receiving random access uplink data based on the one or more resource units.

In some embodiments, an apparatus for wireless communication may perform some of the functions of method 1500. The apparatus comprises means for generating a clear to transmit (CTX) message indicating an uplink transmission opportunity, the CTX message further comprising a request for two or more stations to concurrently transmit uplink data at a specific time. In some aspects, the means for generating may comprise one or more of the processor 304, the memory 306, or equivalents thereof. The apparatus may further comprise means for transmitting the CTX message to the two or more stations. In some aspects, the means for transmitting may comprise one or more of the transmitter 310, the transceiver 314, or equivalents thereof. The apparatus may further comprise means for receiving a plurality of uplink data transmissions at the specific time from at least two stations of the two or more stations. In some aspects, the means for receiving may comprise one or more of the receiver 312, the transceiver 314, or equivalents thereof.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a wireless station and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless station and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication comprising:
an electronic hardware processor configured to generate a clear to transmit message comprising a first indication of an uplink transmission opportunity, the clear to transmit message further comprising a request for two or more stations to concurrently transmit uplink data at a specific time, the clear to transmit message further comprising a common information field including information common to all of the two or more stations, the clear to transmit message further comprising two or more individual information fields corresponding to each of the two or more stations respectively, the clear to transmit message further comprising a duration field indicating a length for a plurality of uplink data transmissions to be received from the two or more stations at the specific time, wherein the indicated length corresponds to a number of orthogonal frequency-division multiplexing symbols;
a transmitter configured to transmit the clear to transmit message to the two or more stations; and
a receiver configured to receive the plurality of uplink data transmissions at the specific time from at least two stations of the two or more stations.

2. The apparatus of claim 1, wherein the duration field comprises nine bits.

3. The apparatus of claim 1, wherein the electronic hardware processor is further configured to generate the clear to transmit message to comprise an indication of whether the two or more stations are to include packet extension symbols at an end of the plurality of uplink data transmissions.

4. The apparatus of claim 1, wherein the electronic hardware processor is further configured to generate the clear to transmit message to comprise a second indication that the two or more stations are to consider a state of a wireless medium before transmitting, and wherein the clear to transmit message further comprises a third indication of a clear channel assessment threshold to be utilized by the two or more stations in considering the state of the wireless medium.

5. The apparatus of claim 1, wherein:
the electronic hardware processor is further configured to determine one or more resource units for random access and include an indication of the one or more resource units in the clear to transmit message, and
the receiver is further configured to receive random access uplink data based on the one or more resource units.

6. The apparatus of claim 1, wherein the electronic hardware processor is further configured to generate the clear to transmit message to comprise a second indication of a packet type to be utilized by the two or more stations for the plurality of uplink data transmissions and a third indication of whether associated or unassociated stations may transmit during the uplink transmission opportunity.

7. The apparatus of claim 1, wherein the electronic hardware processor is further configured to generate the clear to transmit message to comprise a second indication of a transmit power of the clear to transmit message and a target receive power for the plurality of uplink data transmissions.

8. A method for wireless communication comprising:
generating, via an electronic hardware processor, a clear to transmit message indicating an uplink transmission opportunity and a request for two or more stations to concurrently transmit uplink data at a specific time, the clear to transmit message further comprising a common information field including information common to all of the two or more stations, the clear to transmit message further comprising two or more individual information fields corresponding to each of the two or more stations respectively, the clear to transmit message further comprising a duration field indicating a length for a plurality of uplink data transmissions to be received from the two or more stations at the specific time, wherein the indicated length corresponds to a number of orthogonal frequency-division multiplexing symbols;
transmitting, via the electronic hardware processor, the clear to transmit message to the two or more stations; and
receiving, via the electronic hardware processor, the plurality of uplink data transmissions at the specific time from at least two stations of the two or more stations.

9. The method of claim 8, wherein the duration field comprises nine bits.

10. The method of claim 8, further comprising generating the clear to transmit message to further include an indication of whether the two or more stations are to include packet extension symbols at an end of the plurality of uplink data transmissions.

11. The method of claim 8, further comprising generating the clear to transmit message to further include a second indication that the two or more stations are to consider a state of a wireless medium before transmitting, and a third indication of a clear channel assessment threshold to be utilized by the two or more stations in considering the state of the wireless medium.

12. The method of claim 8, further comprising:
determining one or more resource units for random access;
transmitting an indication of the one or more resource units in the clear to transmit message; and
receiving random access uplink data based on the one or more resource units.

13. The method of claim 8, further comprising generating the clear to transmit message to further include an indication of a packet type to be utilized by the two or more stations for the plurality of uplink data transmissions, and wherein the clear to transmit message further comprises an indication of whether associated or unassociated stations may transmit during the uplink transmission opportunity.

14. The method of claim 8, further comprising generating the clear to transmit message to further include an indication of a transmit power of the clear to transmit message and a target receive power for the plurality of uplink data transmissions.

15. An apparatus for wireless communication comprising:
means for generating a clear to transmit message indicating an uplink transmission opportunity, the clear to transmit message further comprising a request for two or more stations to concurrently transmit uplink data at a specific time, the clear to transmit message further comprising a common information field including information common to all of the two or more stations, the clear to transmit message further comprising two or more individual information fields corresponding to each of the two or more stations respectively, the clear to transmit message further comprising a duration field indicating a length for a plurality of uplink data transmissions to be received from the two or more stations at the specific time, wherein the indicated length corresponds to a number of orthogonal frequency-division multiplexing symbols;

means for transmitting the clear to transmit message to the two or more stations; and means for receiving the plurality of uplink data transmissions at the specific time from at least two stations of the two or more stations.

16. The apparatus of claim 15, wherein the duration field comprises nine bits.

17. The apparatus of claim 15, wherein the means for generating is configured to generate the clear to transmit message to include an indication of whether the two or more stations are to include packet extension symbols at an end of the plurality of uplink data transmissions.

18. The apparatus of claim 15, wherein the means for generating is configured to generate the clear to transmit message to include a second indication that the two or more stations are to consider a state of a wireless medium before transmitting, and is also configured to generate the clear to transmit message to include a third indication of a clear channel assessment threshold to be utilized by the two or more stations in considering the state of the wireless medium.

19. The apparatus of claim 15, further comprising:
means for determining one or more resource units for random access;
means for transmitting an indication of the one or more resource units in the clear to transmit message; and
means for receiving random access uplink data based on the one or more resource units.

20. The apparatus of claim 15, wherein the means for generating is configured to generate the clear to transmit message to include a second indication of a packet type to be utilized by the two or more stations for the plurality of uplink data transmissions, and wherein the means for generating is also configured to generate the clear to transmit message to further include a third indication of whether associated or unassociated stations may transmit during the uplink transmission opportunity.

21. The apparatus of claim 15, wherein the means for generating is configured to generate the clear to transmit message to include an indication of a transmit power of the clear to transmit message and a target receive power for the plurality of uplink data transmissions.

22. A non-transitory computer-readable medium comprising instructions that when executed cause a processor to perform a method of:
generating a clear to transmit message indicating an uplink transmission opportunity, the clear to transmit message further comprising a request for two or more stations to concurrently transmit uplink data at a specific time, the clear to transmit message further comprising a common information field including information common to all of the two or more stations, the clear to transmit message further comprising two or more individual information fields corresponding to each of the two or more stations respectively, the clear to transmit message further comprising a duration field indicating a length for a plurality of uplink data transmissions to be received from the two or more stations at the specific time, wherein the indicated length corresponds to a number of orthogonal frequency-division multiplexing symbols;
transmitting the clear to transmit message to the two or more stations; and
receiving the plurality of uplink data transmissions at the specific time from at least two stations of the two or more stations.

23. The non-transitory computer readable medium of claim 22, wherein the duration field comprises nine bits.

24. The non-transitory computer readable medium of claim 22, wherein the clear to transmit message is further generated to comprise an indication of whether the two or more stations are to include packet extension symbols at an end of the plurality of uplink data transmissions.

25. The non-transitory computer readable medium of claim 22, wherein the clear to transmit message is further generated to comprise a second indication that the two or more stations are to consider a state of a wireless medium before transmitting, and wherein the clear to transmit message further comprises a third indication of a clear channel assessment threshold to be utilized by the two or more stations in considering the state of the wireless medium.

26. The non-transitory computer readable medium of claim 22, the method further comprising:
determining one or more resource units for random access;
transmitting an indication of the one or more resource units in the clear to transmit message; and
receiving random access uplink data based on the one or more resource units.

27. The non-transitory computer readable medium of claim 22, wherein the clear to transmit message is further generated to comprise an indication of a packet type to be utilized by the two or more stations for the plurality of uplink data transmissions, and wherein the clear to transmit message further comprises an indication of whether associated or unassociated stations may transmit during the uplink transmission opportunity.

28. The non-transitory computer readable medium of claim 22, wherein the clear to transmit message is further generated to comprise an indication of a transmit power of the clear to transmit message and a target receive power for the plurality of uplink data transmissions.

* * * * *